US012666038B2

(12) United States Patent　　　(10) Patent No.:　US 12,666,038 B2
Wang et al.　　　　　　　　　　 (45) Date of Patent:　Jun. 23, 2026

---

(54) METHOD FOR TEMPORAL MOTION INFORMATION PREDICTION, METHOD FOR CANDIDATE MOTION INFORMATION LIST CONSTRUCTING, AND METHOD FOR VIDEO DECODING

(71) Applicant: GUANGDONG OPPO MOBILE TELECOMMUNICATIONS CORP., LTD., Dongguan (CN)

(72) Inventors: Fan Wang, Dongguan (CN); Zhihuang Xie, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 58 days.

(21) Appl. No.: 18/762,618

(22) Filed: Jul. 2, 2024

(65) Prior Publication Data

US 2024/0357126 A1　　Oct. 24, 2024

Related U.S. Application Data

(63) Continuation of application No. PCT/CN2022/070182, filed on Jan. 4, 2022.

(51) Int. Cl.
　　H04N 19/139　　(2014.01)
　　G06V 10/74　　(2022.01)
　　　　　(Continued)

(52) U.S. Cl.
　　CPC ......... H04N 19/139 (2014.11); G06V 10/761 (2022.01); H04N 19/119 (2014.11); H04N 19/176 (2014.11); H04N 19/46 (2014.11)

(58) Field of Classification Search
　　None
　　See application file for complete search history.

(56) References Cited

U.S. PATENT DOCUMENTS

2020/0413045 A1*　12/2020　Zhang .................. H04N 19/523
2021/0092379 A1*　3/2021　Zhang .................. H04N 19/105
(Continued)

FOREIGN PATENT DOCUMENTS

CN　　110677658　　1/2020
CN　　111093073　　5/2020
(Continued)

OTHER PUBLICATIONS

WIPO, International Search Report for International Application No. PCT/CN2022/070182, May 26, 2022.
(Continued)

*Primary Examiner* — Kaitlin A Retallick
(74) *Attorney, Agent, or Firm* — Hodgson Russ LLP

(57)　　　　　ABSTRACT

A method for temporal motion information prediction is provided. The method includes the following. At least one non-adjacent position of a current block is determined. First temporal motion information of the current block is determined according to motion information of the at least one non-adjacent position in a coded picture. The coded picture is a reference picture of the current block, and the first temporal motion information of the current block is determined according to the motion information of the at least one non-adjacent position in the coded picture as follows. A collocated block corresponding to the non-adjacent position in the reference picture is determined. Motion information of the collocated block is obtained. The first temporal motion information of the current block is obtained by scaling a motion vector in the obtained motion information.

19 Claims, 12 Drawing Sheets

(51) Int. Cl.
H04N 19/119 (2014.01)
H04N 19/176 (2014.01)
H04N 19/46 (2014.01)

(56) References Cited

U.S. PATENT DOCUMENTS

| | | | | |
|---|---|---|---|---|
| 2021/0400289 A1* | 12/2021 | Kalva | .................. | H04N 19/593 |
| 2023/0103767 A1* | 4/2023 | Chang | .................... | H04N 19/88 |
| | | | | 375/240.12 |
| 2024/0259588 A1* | 8/2024 | Zhao | .................... | H04N 19/146 |
| 2024/0291967 A1* | 8/2024 | Zhao | ...................... | H04N 19/52 |

FOREIGN PATENT DOCUMENTS

| | | |
|---|---|---|
| CN | 112135137 | 12/2020 |
| CN | 113709484 | 11/2021 |
| CN | 113747172 | 12/2021 |

OTHER PUBLICATIONS

Zhao et al., "Non-EE2: Template Matching Based Merge Candidate List Construction (TM-MCLC)," Joint Video Experts Team (JVET) of ITU-T SG 16 WP 3 and ISO/IEC JTC 1/SC 29, Document: JVET-X0087-v2, Oct. 2021.
JPO, Office Action for JP Application No. 2024-540755, Oct. 31, 2025.

* cited by examiner

110

DETERMINE AT LEAST ONE NON-ADJACENT
POSITION OF CURRENT BLOCK

120

DETERMINE FIRST TEMPORAL MOTION
INFORMATION OF CURRENT BLOCK ACCORDING TO
MOTION INFORMATION OF AT LEAST ONE NON-
ADJACENT POSITION IN CODED PICTURE

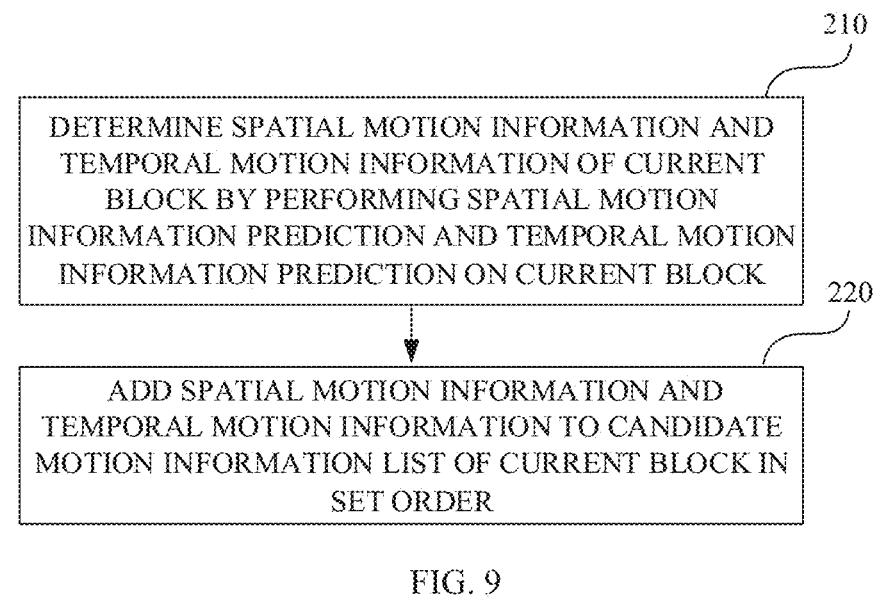

210

```
┌──────────────────────────────────────────────┐
│ DETERMINE SPATIAL MOTION INFORMATION AND      │
│   TEMPORAL MOTION INFORMATION OF CURRENT       │
│    BLOCK BY PERFORMING SPATIAL MOTION          │
│ INFORMATION PREDICTION AND TEMPORAL MOTION     │
│   INFORMATION PREDICTION ON CURRENT BLOCK      │
└──────────────────────────────────────────────┘
```

220

```
┌──────────────────────────────────────────────┐
│    ADD SPATIAL MOTION INFORMATION AND          │
│  TEMPORAL MOTION INFORMATION TO CANDIDATE      │
│ MOTION INFORMATION LIST OF CURRENT BLOCK IN    │
│                 SET ORDER                      │
└──────────────────────────────────────────────┘
```

FIG. 9

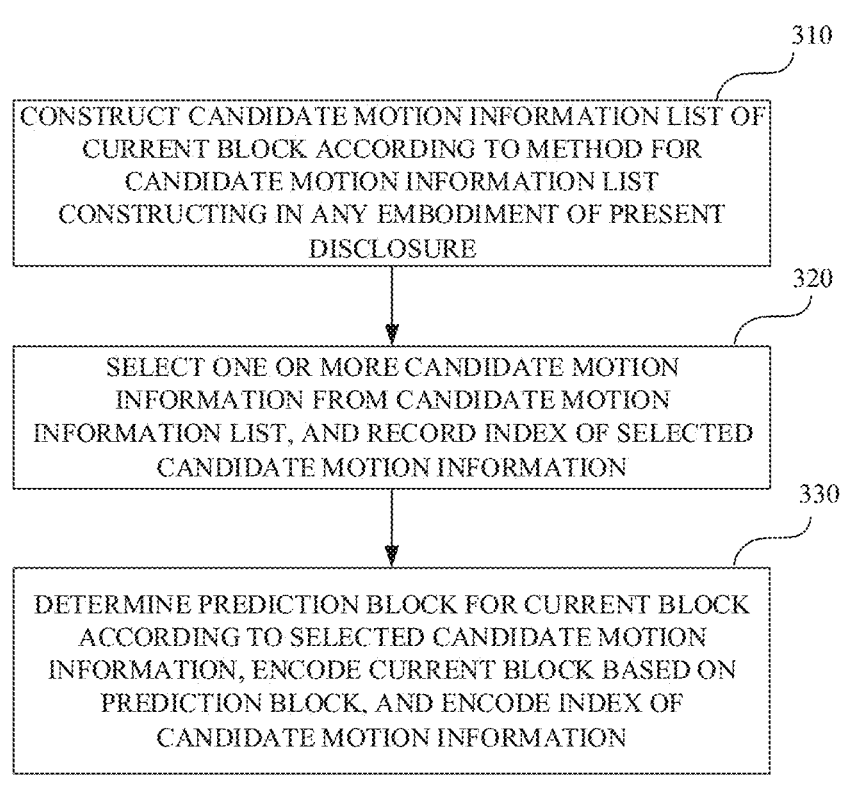

CONSTRUCT CANDIDATE MOTION INFORMATION LIST OF CURRENT BLOCK ACCORDING TO METHOD FOR CANDIDATE MOTION INFORMATION LIST CONSTRUCTING IN ANY EMBODIMENT OF PRESENT DISCLOSURE — 310

SELECT ONE OR MORE CANDIDATE MOTION INFORMATION FROM CANDIDATE MOTION INFORMATION LIST, AND RECORD INDEX OF SELECTED CANDIDATE MOTION INFORMATION — 320

DETERMINE PREDICTION BLOCK FOR CURRENT BLOCK ACCORDING TO SELECTED CANDIDATE MOTION INFORMATION, ENCODE CURRENT BLOCK BASED ON PREDICTION BLOCK, AND ENCODE INDEX OF CANDIDATE MOTION INFORMATION — 330

FIG. 14

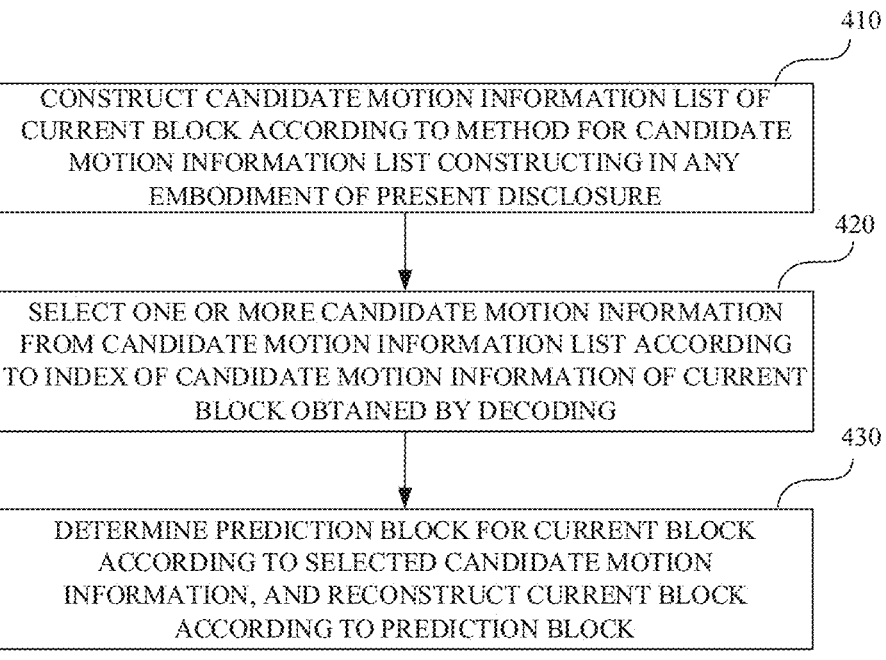

CONSTRUCT CANDIDATE MOTION INFORMATION LIST OF CURRENT BLOCK ACCORDING TO METHOD FOR CANDIDATE MOTION INFORMATION LIST CONSTRUCTING IN ANY EMBODIMENT OF PRESENT DISCLOSURE — 410

SELECT ONE OR MORE CANDIDATE MOTION INFORMATION FROM CANDIDATE MOTION INFORMATION LIST ACCORDING TO INDEX OF CANDIDATE MOTION INFORMATION OF CURRENT BLOCK OBTAINED BY DECODING — 420

DETERMINE PREDICTION BLOCK FOR CURRENT BLOCK ACCORDING TO SELECTED CANDIDATE MOTION INFORMATION, AND RECONSTRUCT CURRENT BLOCK ACCORDING TO PREDICTION BLOCK — 430

FIG. 15

METHOD FOR TEMPORAL MOTION INFORMATION PREDICTION, METHOD FOR CANDIDATE MOTION INFORMATION LIST CONSTRUCTING, AND METHOD FOR VIDEO DECODING

CROSS REFERENCE TO RELATED APPLICATION(S)

This application is a continuation of International Application No. PCT/CN2022/070182, filed Jan. 4, 2022, the entire disclosure of which is incorporated herein by reference.

TECHNICAL FIELD

This disclosure relates to, but is not limited to, video technologies, and in particular to a method for temporal motion information prediction, a method for candidate motion information list constructing, and a method for video decoding.

BACKGROUND

At present, a block-based hybrid coding framework is adopted by all common video coding standards. Each picture, sub-picture, or frame in a video is divided into square largest coding units (LCUs) or coding tree units (CTUs) of a same size (such as 128×128, 64×64, etc.). Each LCU or CTU can be divided into rectangular coding units (CUs) according to rules. The CU may further be divided into prediction units (PUs), transform units (TUs), etc. The hybrid coding framework includes modules such as prediction, transform, quantization, entropy coding, in-loop filter, etc. The prediction module includes intra prediction and inter prediction. The inter prediction includes motion estimation and motion compensation. Since there is a strong correlation between adjacent samples in a video picture, intra prediction is used in the video coding technology to eliminate spatial redundancy between adjacent samples. Since there is a strong similarity between adjacent pictures in the video, inter prediction is used in the video coding technology to eliminate temporal redundancy between adjacent pictures, thereby improving coding efficiency.

However, the coding efficiency of existing inter prediction methods still needs to be improved.

SUMMARY

In a first aspect, a method for temporal motion information prediction is provided in an embodiment of the present disclosure. The method includes the following. At least one non-adjacent position of a current block is determined. First temporal motion information of the current block is determined according to motion information of the at least one non-adjacent position in a coded picture.

In a second aspect, a method for candidate motion information list constructing is provided in an embodiment of the present disclosure. The method includes the following. Spatial motion information and temporal motion information of a current block are determined by performing spatial motion information prediction and temporal motion information prediction on the current block. The spatial motion information and the temporal motion information are added to a candidate motion information list of the current block in a set order. The temporal motion information prediction adopts the method for temporal motion information prediction in the first aspect. The temporal motion information includes the first temporal motion information.

In a third aspect, a method for video decoding is provided in an embodiment of the present disclosure. The method includes the following. A candidate motion information list of a current block is constructed according to the method for candidate motion information list constructing in the second aspect. One or more candidate motion information is selected from the candidate motion information list according to an index of candidate motion information of the current block obtained by decoding. A prediction block for the current block is determined according to the selected candidate motion information, and the current block is reconstructed according to the prediction block.

BRIEF DESCRIPTION OF THE DRAWINGS

The accompanying drawings are used for facilitating the understanding of embodiments of the present disclosure, constitute a part of the specification, and are used for explaining technical solutions of the present disclosure together with embodiments of the present disclosure, but do not constitute a limitation on the technical solutions of the present disclosure.

FIG. 9 is a flowchart of a method for candidate motion information list constructing according to an embodiment of the present disclosure.

FIG. 14 is a flowchart of a method for video encoding according to an embodiment of the present disclosure.

FIG. 15 is a flowchart of a method for video decoding according to an embodiment of the present disclosure.

DETAILED DESCRIPTION

Figure 1A:
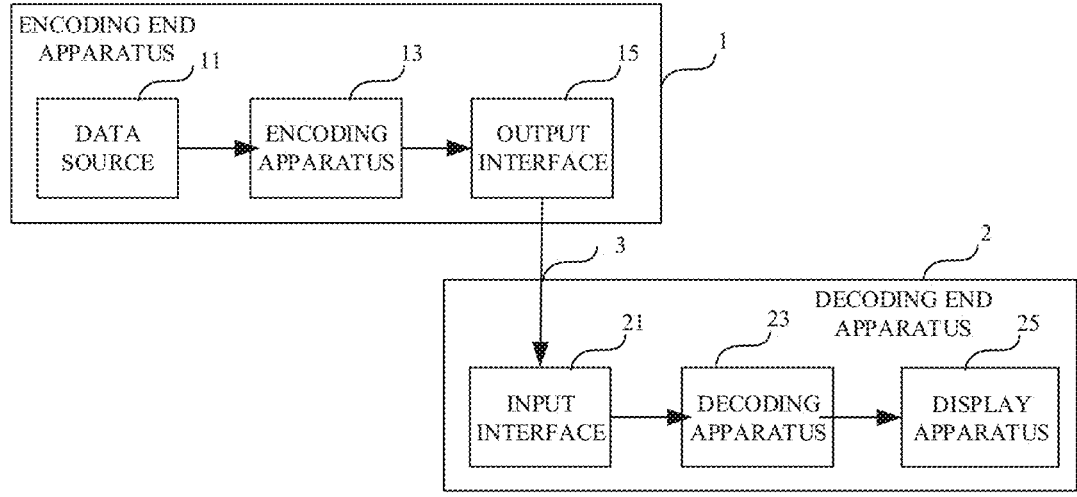
FIG. 1A is a schematic diagram of a system for coding according to an embodiment of the present disclosure.

Multiple embodiments are described in this disclosure, but such elaboration is intended for illustration rather than limitation. It will be apparent to those of ordinary skill in the art that, there can be other embodiments and implementations within the protection scope of the embodiments described in the disclosure.

In the elaborations of the disclosure, terms such as "exemplary" or "for example" are used to indicate an example, an illustration, or an explanation. Any embodiment described as "exemplary" or "for example" in the disclosure shall not be construed as preferable or advantageous over other embodiments. The term "and/or" in the disclosure describes an association between associated objects, and indicates that there may be three relationships. For example, A and/or B may mean A alone, both A and B exist, and B alone. "A plurality of" or "multiple" means two or more than two. In addition, in order to describe clearly technical solutions of the embodiments of the disclosure, terms such as "first" and "second" are used to distinguish the same items or similar items having substantially the same functions and effects. Those skilled in the art can understand that terms such as "first" and "second" do not limit the quantity and the execution order, and do not mean that there must be a difference between items.

When describing exemplary embodiments, the methods and/or procedures may be presented as a particular sequence of steps in the specification. However, if the method or procedure does not depend on the particular order of steps described herein, the method or procedure shall not be limited to the particular order of steps described. It can be understood by those of ordinary skill in the art that other sequences of steps are also possible. Thus, the particular order of steps described in the specification shall not be construed as a limitation on the claims. In addition, the claims regarding the methods and/or procedures shall not be limited to implementing the steps in the described order. It can be understood by those of ordinary skill in the art that these orders can be changed without departing from the spirit and scope of embodiments of the disclosure.

In the present disclosure, a video picture is abbreviated as a picture, and the picture includes a video picture and a partial area in the video picture. The partial area in the video picture may be, for example, a sub-picture, a slice, a slice segment, etc., divided from the video picture.

In the present disclosure, motion information derived through motion information prediction (also referred to as motion information predictor) indicating a prediction operation includes reference picture information and motion vector (MV) information. In related video standards, "motion vector predictor" indicates the prediction operation sometimes, and information derived through the "motion vector predictor" also includes both the reference picture information and the MV information, rather than only the MV information. Therefore, the "motion vector predictor" may also be understood as the motion information prediction indicating the prediction operation in the present disclosure.

In the present disclosure, "temporal motion information" indicates motion information obtained through temporal motion information prediction (also referred to as temporal motion information predictor or temporal motion vector predictor). The temporal motion information prediction may be expressed as "temporal motion vector prediction" in standards sometimes. In the present disclosure, "spatial motion information" indicates motion information obtained through spatial motion information prediction (also referred to as spatial motion information predictor or spatial motion vector predictor). The spatial motion information prediction may be expressed as spatial motion vector prediction in standards sometimes. In the present disclosure, the motion information as a predicted result may also be expressed as a motion vector prediction in some standards.

In the present disclosure, a non-adjacent position of a current block refers to a position whose coordinates are not adjacent to any samples in the current block. An adjacent position of the current block refers to a position whose coordinates are adjacent to at least one sample in the current block.

In the present disclosure, the current block may be a current coding unit (CU), a current prediction unit (PU), etc. A current picture refers to a picture where the current block is located, and a current picture sequence refers to a picture sequence where the current block is located.

FIG. 1A is a block diagram of a system for video coding applicable to embodiments of the present disclosure. As illustrated in FIG. 1A, the system includes an encoding end apparatus 1 and a decoding end apparatus 2. The encoding end apparatus 1 is configured to generate a bitstream. The decoding end apparatus 2 is configured to decode the bitstream. The encoding end apparatus 1 and the decoding end apparatus 2 each may include one or more processors and a memory coupled to the one or more processors. For example, the memory is a random access memory (RAM), an electrically erasable programmable read-only memory (EEPROM), a flash memory, or other media. The encoding end apparatus 1 and the decoding end apparatus 2 may be implemented with various apparatuses, such as a desktop computer, a mobile computing apparatus, a laptop computer, a tablet computer, a set-top box, a television, a camera, a display apparatus, a digital media player, a vehicle-mounted computer, or other similar apparatuses.

The decoding end apparatus 2 can receive the bitstream from the encoding end apparatus 1 via a link 3. The link 3 includes one or more media or apparatuses capable of transmitting the bitstream from the encoding end apparatus 1 to the decoding end apparatus 2. In an example, the link 3 includes one or more communication media that enable the encoding end apparatus 1 to transmit the bitstream directly to the decoding end apparatus 2. The encoding end apparatus 1 may modulate the bitstream according to communication standards (such as a wireless communication protocol) and may transmit the modulated bitstream to the decoding end apparatus 2. The one or more communication media may include wireless and/or wired communication media, such as a radio frequency (RF) spectrum or one or more physical transmission lines. The one or more communication media may form a part of a packet-based network, such as a local area network (LAN), a wide area network (WAN), or a global network (such as the Internet). The one or more communication media may include routers, switches, base stations, or other devices that facilitate communication from the encoding end apparatus 1 to the decoding end apparatus 2. In another example, the bitstream may also be output from an output interface 15 to a storage apparatus, and the decoding end apparatus 2 may read stored data from the storage apparatus via streaming or downloading.

In the example illustrated in FIG. 1A, the encoding end apparatus 1 includes a data source 11, an encoding apparatus 13, and an output interface 15. In some examples, the data source 11 may include a video capture apparatus (e.g., a camera), an archive containing previously captured data, a feeding interface for receiving data from a content provider, a computer graphics system for generating data, or a combination thereof. The encoding apparatus 13 can encode data from the data source 11 and output the encoded data to the output interface 15. The output interface 15 may include at least one of a regulator, a modem, or a transmitter.

In the example illustrated in FIG. 1A, the decoding end apparatus 2 includes an input interface 21, a decoding apparatus 23, and a display apparatus 25. In some examples, the input interface 21 includes at least one of a receiver or a modem. The input interface 21 may receive the bitstream via the link 3 or from the storage apparatus. The decoding apparatus 23 decodes the received bitstream. The display apparatus 25 is configured to display the decoded data, and the display apparatus 25 may be integrated with other apparatuses of the decoding end apparatus 2 or set separately. The display apparatus 25 may be, for example, a liquid crystal display (LCD), a plasma display, an organic light emitting diode (OLED) display, or a display apparatus of another type. In other examples, the decoding end apparatus 2 may not include the display apparatus 25, or may include other apparatuses or devices to which the decoded data is applicable.

Based on the system for video coding as illustrated in FIG. 1A, various methods for video coding may be used for video compression. The international video coding standards include H.264/advanced video coding (AVC), H.265/high efficiency video coding (HEVC), H.266/versatile video coding (VVC), a moving picture experts group (MPEG), an alliance for open media (AOM), an audio video coding standard (AVS), and extensions thereof, any other customized standards, and the like. In these standards, video compression technology is used to reduce the amount of data transmitted and the amount of data stored, thereby improving the efficiency of video coding, transmission, and storage. A block-based hybrid coding method is used in all the video coding standards mentioned above. Embodiments of the present disclosure are applicable to a basic process of a video codec under the block-based hybrid coding framework, but are not limited to the framework and the process.

Figure 1B:
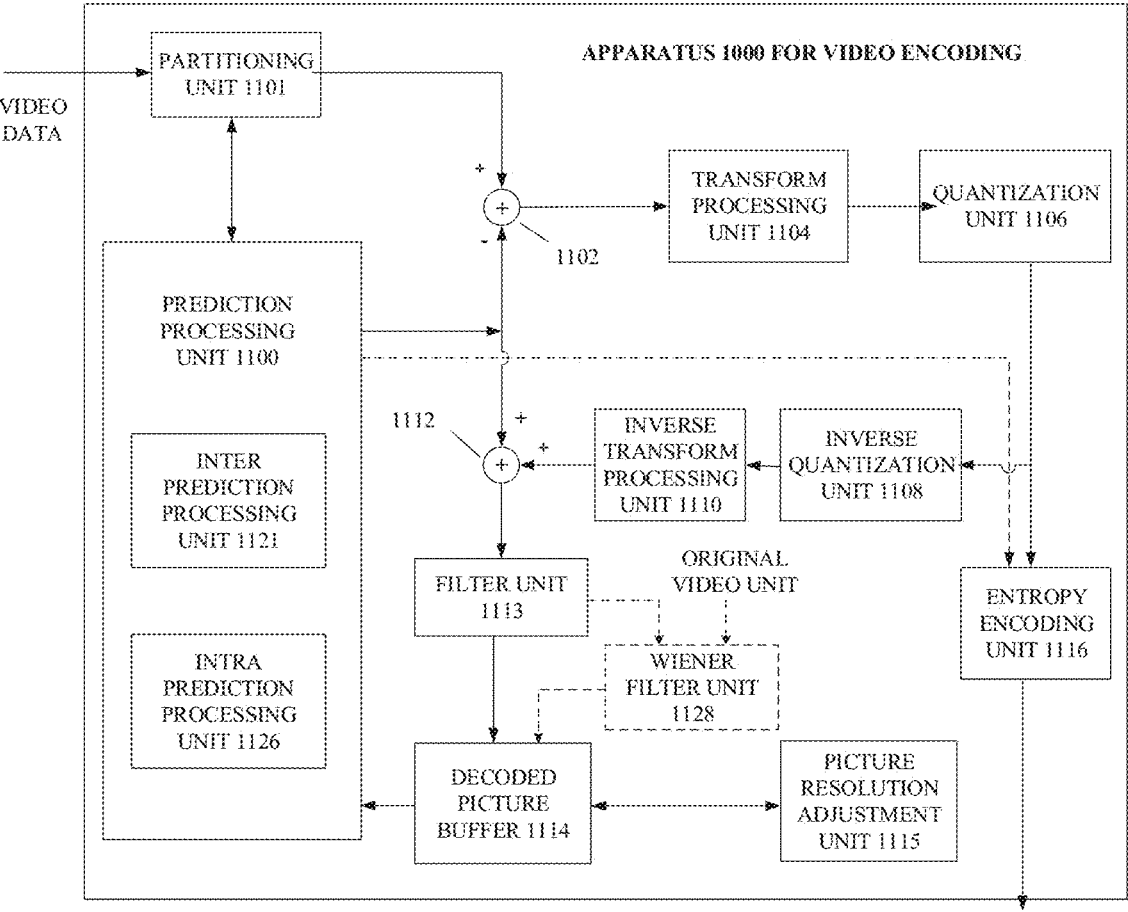
FIG. 1B is a structural diagram of an apparatus for video encoding according to an embodiment of the present disclosure.

FIG. 1B is a block diagram of an exemplary apparatus for video encoding applicable to embodiments of the present disclosure.

As illustrated in FIG. 1B, the apparatus 1000 for video encoding includes a prediction processing unit 1100, a partitioning unit 1101, a residual generation unit 1102, a transform processing unit 1104, a quantization unit 1106, an inverse quantization unit 1108, an inverse transform processing unit 1110, a reconstruction unit 1112, a filter unit 1113, a decoded picture buffer 1114, a picture resolution adjustment unit 1115, and an entropy encoding unit 1116. The prediction processing unit 1100 includes an inter prediction processing unit 1121 and an intra prediction processing unit 1126. The apparatus 1000 for video encoding may also include more, fewer, or different functional components than those illustrated in this example.

The partitioning unit 1101 is configured to partition, in cooperation with the prediction processing unit 1100, received video data into slices, CTUs, or other larger units. The video data received by the partitioning unit 1101 may be a video sequence of video frames such as an I-frame, a P-frame, or a B-frame.

The prediction processing unit 1100 may divide a CTU into CUs, and perform intra prediction coding or inter prediction coding on the CU. When the intra prediction and the inter prediction are performed on the CU, the CU may be partitioned into one or more PUs.

The inter prediction processing unit 1121 may perform inter prediction on a PU to generate prediction data for the PU, where the prediction data includes a prediction block for the PU, motion information of the PU, and various syntax elements.

The intra-prediction processing unit 1126 may perform intra prediction on a PU to generate prediction data for the PU, where the prediction data for the PU may include a prediction block for the PU and various syntax elements.

The residual generation unit 1102 may generate a residual block for a CU by subtracting a prediction block for a PU obtained by partitioning the CU from an original block for the CU.

The transform processing unit 1104 may partition a CU into one or more transform units (TUs). A TU-associated residual block is a sub-block obtained by partitioning a residual block for a CU. A TU-associated coefficient block is generated by performing one or more transforms on the TU-associated residual block.

The quantization unit 1106 may quantize coefficients in a coefficient block based on a selected quantization parameter (QP), and may adjust a degree of quantization for the coefficient block by adjusting a QP value.

The inverse quantization unit 1108 may perform inverse quantization on the coefficient block, and the inverse transform unit 1110 may perform inverse transform on the coefficient block, so as to obtain a TU-associated reconstructed residual block.

The reconstruction unit 1112 may add the reconstructed residual block to the prediction block generated by the prediction processing unit 1100, so as to generate a reconstructed block for a CU.

The filter unit 1113 performs in-loop filtering on the reconstructed block, and buffers the reconstructed block subject to in-loop filtering in the decoded picture buffer 1114 as a reference picture. The intra-prediction processing unit 1126 may extract a reference picture for blocks adjacent to a PU from the decoded picture buffer 1114 to perform intra prediction. The inter prediction processing unit 1121 may perform inter prediction on a PU in a current picture by using a reference picture for a previous picture buffered in the decoded picture buffer 1114.

The picture resolution adjustment unit 1115 resamples reference pictures buffered in the decoded picture buffer 1114, which may include upsampling and/or downsampling, so as to obtain reference pictures with various resolutions and buffer the reference pictures in the decoded picture buffer 1114.

The entropy encoding unit 1116 may perform entropy coding on received data, such as a syntax element, a quantized coefficient block, motion information, and the like.

Figures 1C, 2:
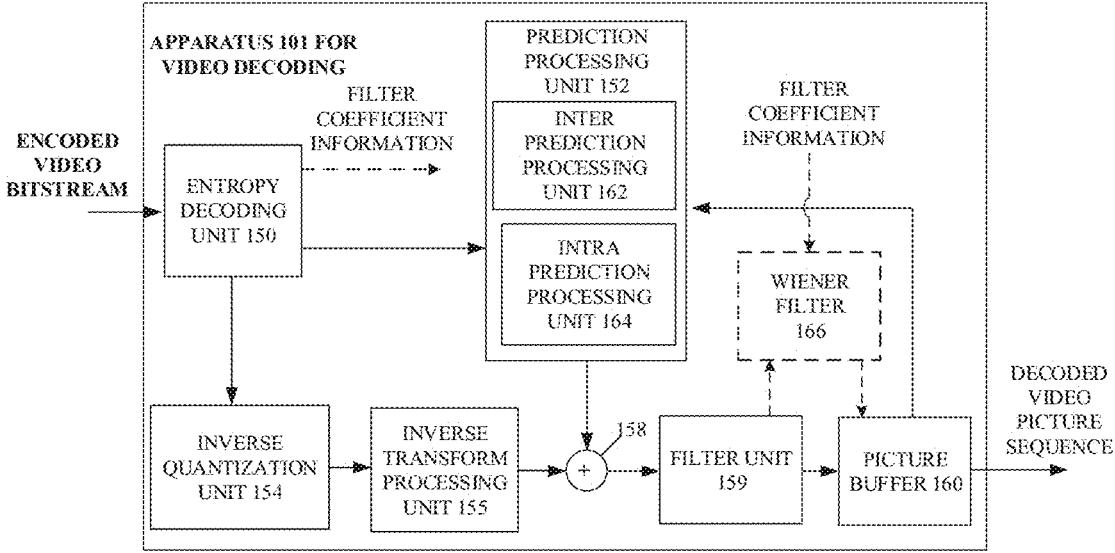
FIG. 1C is a structural diagram of an apparatus for video decoding according to an embodiment of the present disclosure.
FIG. 2 is a schematic diagram illustrating a reference relationship between a current block and reference blocks in two directions.

FIG. 1C is a block diagram of an exemplary apparatus for video decoding applicable to embodiments of the present disclosure.

As illustrated in FIG. 1C, the apparatus 101 for video decoding includes an entropy decoding unit 150, a prediction processing unit 152, an inverse quantization unit 154, an inverse transform processing unit 155, a reconstruction unit 158 (denoted by a circle with a plus sign in the figure), a filter unit 159, and a picture buffer 160. In other embodiments, the apparatus 101 for video decoding may include more, fewer, or different functional components.

The entropy decoding unit 150 may perform entropy decoding on a received bitstream, and extract information such as a syntax element, a quantized coefficient block, and motion information of a PU. The prediction processing unit 152, the inverse quantization unit 154, the inverse transform processing unit 155, the reconstruction unit 158, and the filter unit 159 may perform their respective operations based on the syntax element extracted from the bitstream.

As a functional component for performing reconstruction, the inverse quantization unit 154 may perform inverse quantization on a quantized TU-associated coefficient block, and the inverse transform processing unit 155 may perform one or more inverse transforms on the inverse quantized coefficient block so as to generate a reconstructed residual block for a TU.

The prediction processing unit 152 includes an inter prediction processing unit 162 and an intra prediction processing unit 164. If a PU is encoded by intra coding, the intra prediction processing unit 164 may determine an intra prediction mode for the PU based on the syntax element parsed from the bitstream, perform intra prediction according to the determined intra prediction mode and reconstructed reference information adjacent to the PU obtained from the picture buffer 160, and generate a prediction block for the PU. If the PU is encoded by inter coding, the inter prediction processing unit 162 may determine one or more reference blocks for the PU according to motion information of the PU and a corresponding syntax element, and generate a prediction block for the PU based on the reference blocks.

The reconstruction unit 158 may obtain a reconstructed block for a CU based on a TU-associated reconstructed residual block and the prediction block (namely, intra prediction data or inter prediction data) for the PU generated by the prediction processing unit 152.

The filter unit 159 may perform in-loop filtering on the reconstructed block for the CU, so as to obtain a reconstructed picture, where the reconstructed picture is stored in the picture buffer 160. The picture buffer 160 may provide reference pictures for subsequent motion compensation, intra prediction, inter prediction, etc., or may output reconstructed video data as decoded video data for presentation on a display apparatus.

The display apparatus 25 described above may be, for example, an LCD, a plasma display, an OLED display, or other types of display apparatuses. In other examples, the decoding end may not include the display apparatus 25, but include other apparatuses to which the decoded data is applicable.

A basic process of video coding is as follows. At an encoding end, a picture (or frame) is partitioned into blocks. A prediction block for a current block is generated by performing intra prediction or inter prediction on the current block. A residual block is obtained by subtracting the prediction block from an original block of the current block. A quantization coefficient matrix is obtained by performing transform and quantization on the residual block. The quantization coefficient matrix is encoded into a bitstream by entropy encoding. At a decoding end, the prediction block for the current block is generated by performing intra prediction or inter prediction on the current block. On the other hand, the quantization coefficient matrix is obtained by parsing the bitstream, the residual block is obtained by performing inverse quantization and inverse transformation on the quantization coefficient matrix, and the reconstructed block is obtained by adding the prediction block and the residual block. The reconstructed blocks form a reconstructed picture. A decoded picture is obtained by performing loop filtering on the reconstructed picture on a picture basis or on a block basis. Similar operations for obtaining the decoded picture are also required at the encoding end. The decoded picture may be a reference picture of a subsequent picture for inter prediction. Block partition information determined at the encoding end, as well as mode information or parameter information for prediction, transformation, quantization, entropy coding, loop filtering, etc., are carried in the bitstream when necessary. The decoding end parses the bitstream and analyzes existing information to determine the block partition information, as well as the mode information or the parameter information for prediction, transformation, quantization, entropy coding, loop filtering, etc. the same as such information at the encoding end, so as to ensure that the decoded picture obtained by the encoding end is the same as the decoded picture obtained by the decoding end. The decoded picture obtained by the encoding end is also referred to as reconstructed picture. The current block can be partitioned into PUs during prediction. The above is the basic process of the video codec under the block-based hybrid coding framework. With the development of technology, some modules or steps of the framework or process may be optimized.

Motion and Motion Information

A video consists of pictures. In order to make a video smooth, each second of the video includes dozens or even hundreds of pictures, such as 24 pictures per second, 30 pictures per second, 50 pictures per second, 60 pictures per second, 120 pictures per second, etc. Therefore, there is very obvious temporal redundancy in the video. In other words, there are a lot of temporal correlations. "Motion" is often used in inter prediction so as to utilize the temporal correlations. A very simple "motion" model is as follows. An object is at a position on a picture corresponding to a moment, and after a certain period of time, the object translates to another position on the picture corresponding to a current moment, which is the most basic and commonly used translation motion in video coding. The "motion" is indicated by motion information in inter prediction. Basic motion information includes reference picture (such as reference frame) information and MV information. The codec determines a reference picture according to the reference picture information and determines coordinates of a reference block according to the MV information and coordinates of a current block. The reference block is determined according to the coordinates of the reference block in the reference picture. Motion in a video is not always simple. Even translation motion will have slight changes over time, such as slight deformation, brightness changes, noise changes, etc. Prediction may be performed on the current block by using more than one reference block, so as to achieve better prediction results. For example, in commonly used bidirectional prediction, prediction may be performed on the current block by using two reference blocks. The two reference blocks may be a forward reference block and a backward reference block, and may be two forward reference blocks or two backward reference blocks. The "forward" indicates that a time corresponding to the reference picture is before a current picture, and the "backward" indicates that the time corresponding to the reference picture is after the current picture. Alternatively, the "forward" indicates that a position of the reference picture in a video is before the current picture, and the "backward" indicates that the position of the reference picture in a video is after the current picture. Alternatively, the "forward" indicates that a picture order count (POC) of the reference picture is less than a POC of the current picture, and the "backward"

indicates that the POC of the reference picture is greater than the POC of the current picture. Prediction with more reference blocks may be supported in future video coding standards. A simple way to generate a prediction block by using two reference blocks is to average sample values of corresponding positions of the two reference blocks to obtain the prediction block. In order to achieve a better prediction effect, weighted averaging may also be used, such as a bi-prediction with CU-level weight (BCW) currently used in VVC. A geometric partitioning mode (GPM) in VVC may also be understood as a special bidirectional prediction. In order to use the bidirectional prediction, two reference blocks are needed, and thus two sets of reference picture information and MV information are needed. Each set of reference picture information and MV information may be understood as one unidirectional motion information.

The motion in a video does not just include simple translation, but also includes scaling, rotation, distortion, and various forms. The two sets of reference picture information and MV information may be combined together to form one bidirectional motion information. In a specific implementation, a same data structure may be used for the unidirectional motion information and the bidirectional motion information, the two sets of reference picture information and MV information of the bidirectional motion information are valid, while one of the two sets of reference picture information and MV information of the unidirectional motion information is invalid. The motion may be complex. Affine is used in VVC for simulating some simple motions. An affine model in VVC uses 2 or 3 control points from which a linear model is used for deriving an MV of each subblock in a current block. In this case, because all motion vectors direct to a same reference picture, "motion vector" is used instead of "motion information". It can be understood that a regular translation motion is to find a "whole block" from the reference picture, while the affine is to find a set of non-adjacent "sub-blocks" from the reference picture. The above is unidirectional prediction. Affine may also realize bidirectional prediction or prediction with more reference blocks. The reference block is composed of sub-blocks. In a specific implementation, one unidirectional motion information in a data structure of affine motion information may include one reference picture information and two or three MV information, or two or three sets of reference picture information and MV information, but all the reference picture information are the same.

Of course, in addition to basic reference picture information and motion vector information, the motion information may also include some additional information, for example, whether a bi-prediction with CU-level weight (BCW), an index of BCW, or the like is used.

Reference Picture (Reference Frame)

The video is processed picture-by-picture without considering parallel processing. A coded picture can be stored in a buffer as a reference picture for a picture to be subsequently coded. Current coding standards have a set of reference picture management methods to manage reference pictures. The reference picture management method manages which pictures can be used as reference pictures for a current picture, along with indexes of these reference pictures, which pictures need to be stored in a buffer, and which pictures can be removed from the buffer since they are no longer used as reference pictures, etc.

According to different orders of picture coding, current commonly used scenarios can be classified into two categories: random access (RA) and low delay (LD). In an LD scenario, a display order for pictures is the same as a coding order for pictures, while in an RA scenario, the display order for pictures and the coding order for pictures can be different. Generally speaking, in the LD scenario, coding is performed picture-by-picture according to an original display order of a video. However, in an RA scenario, a display order of a video can be shuffled for picture coding. To be specific, some pictures can be skipped from coding initially, while subsequent pictures are coded first, and then the skipped pictures are coded. One advantage of RA is that some pictures can refer to reference pictures before and after them, enabling better utilization of "motion" for improved compression efficiency.

The structure of a classic group of pictures (GOP) for RA is illustrated in FIG. 2. A predictive frame (P frame) in FIG. 2 is a frame on which only unidirectional (forward) prediction can be performed. A Bi-predictive frame (B frame) is a frame in which bidirectional prediction can be performed. The limitation of these reference relationships can also be applied to levels below picture level, such as P slice and B slice divided at slice level.

The arrows in FIG. 2 represent reference relationships. An I frame does not require a reference picture. After the I frame with POC 0 is coded, the P frame with POC 4 is coded with reference to the I frame with POC 0. Then, the B frame with POC 2 is coded with reference to the I frame with POC 0 and the P frame with POC, and so on.

The codec uses a reference picture list to manage reference pictures. VVC supports two reference picture lists, denoted as RPL0 and RPL1, where RPL is short for reference picture list. In VVC, P slice can only use RPL0, while B slice can use RPL0 and RPL1. For one slice, each reference picture list involves several reference pictures, and the codec finds a specific reference picture through a reference picture index. VVC uses a reference picture index and a motion vector to represent motion information. For example, VVC uses a reference picture index refIdxL0 corresponding to a reference picture list 0 and a motion vector mvL0 corresponding to the reference picture list 0, as well as a reference picture index refIdxL1 corresponding to a reference picture list 1 and a motion vector mvL1 corresponding to the reference picture list 1 to represent bidirectional motion information described above. The reference picture index corresponding to the reference picture list 0 and the reference picture index corresponding to the reference picture list 1 can be understood as the reference picture information described above. VVC uses two flags, predFlagL0 and predFlagL1, to indicate whether the motion information corresponding to the reference picture list 0 is used and whether the motion information corresponding to the reference picture list 1 is used, respectively. It can also be understood that predFlagL0 and predFlagL1 indicate whether the unidirectional motion information described above is valid.

The precision of motion vectors is not limited to integer pixels. VVC supports prediction with precisions of ½ pixel, ¼ pixel, ⅛ pixel, and 1/16 pixel. Prediction in fractional-pixels requires interpolation in integer pixels. This allows for finer motion vectors to improve prediction quality.

Motion Information Prediction (Motion Vector Prediction)

A reference block for a current block can be found from a reference picture by using motion information, and a prediction block for the current block is determined according to the reference block.

Motion information used for a current block can usually be predicted by using some related information, which can be referred to as motion information prediction or motion vector prediction. For example, motion information used for coded blocks surrounding and adjacent to a current block in a current picture (such as frame or slice) can be used due to strong correlation between adjacent blocks. Also, motion information used for coded blocks surrounding but not adjacent to the current block in the current picture can be used because there is still some degree of correlation between blocks in a surrounding region and the current block, even if these blocks are not adjacent to the current block. This method for motion information prediction by using motion information used for coded blocks surrounding a current block is generally called spatial motion information prediction. In addition to coded blocks surrounding a current block, motion information of blocks related to a position of the current block in a coded picture can also be used for motion information prediction for the current block, which is generally called temporal motion information prediction. Motion information of coded blocks can also be maintained in a list according to a coding order, several different motion information coded recently is generally retained in the list, and the motion information in the list can be used for motion information prediction for the current block, which is generally referred to as history-based motion information prediction (history-based motion vector prediction). Simply put, spatial motion information is derived using motion information from the same picture as the current block, while temporal motion information is derived using motion information in a different picture from the current block.

To utilize spatial motion information prediction, motion information of coded blocks in the current picture (or slice) needs to be saved. Generally, a minimum storage unit, for example, a 4×4 minimum storage unit is set. However, the minimum storage unit can also be 8×8 or of other sizes. Each time the codec codes a block, the codec stores motion information for all minimum storage units corresponding to the block. To find motion information of a block surrounding the current block, a minimum storage unit can be found according to the coordinates, and the motion information can be obtained. Similarly, for temporal motion information prediction, the motion information of a coded picture (or slice) needs to be saved. A minimum storage unit is also generally set, which can be of a size the same as or different from the size of the storage unit for spatial motion information, depending on the relevant standard rules. To find motion information of a block in the picture (or slice), a minimum storage unit can be found according to the coordinates, and the motion information can be obtained. It should be noted that due to the limitation in storage space or implementation complexity, only temporal motion information or spatial motion information in a certain coordinate range may be obtained for the current block.

One or more motion information can be obtained through motion information prediction. If more than one motion information is obtained, one or more motion information should be selected according to some established rules. For example, GPM in VVC uses two motion information, while sub-block based TMVP (SbTMVP) uses one motion information for each sub-block, where TMVP refers to temporal motion vector predictor. In the present disclosure, TMVP indicates adjacent position temporal motion vector predictor.

To utilize predicted motion information, the predicted motion information can be directly adopted as motion information of the current block, as exemplified in merge in HEVC. Optionally, a motion vector difference (MVD) can be combined with the predicted motion information to obtain new motion information. From the perspective of design, it is desirable for predicted motion information to closely approximate the actual motion information, through motion information prediction cannot always be guaranteed to be accurate. Therefore, MVD can be used to obtain more accurate motion information. A new representation method of MVD is introduced in VVC. In the merge mode, this new MVD representation method can be combined with motion vector prediction, referred to as merge with MVD (MMVD). In short, motion information prediction can be used directly or in conjunction with other methods.

The following is an example of a method for merge motion information candidate list constructing in VVC.

Figure 3:
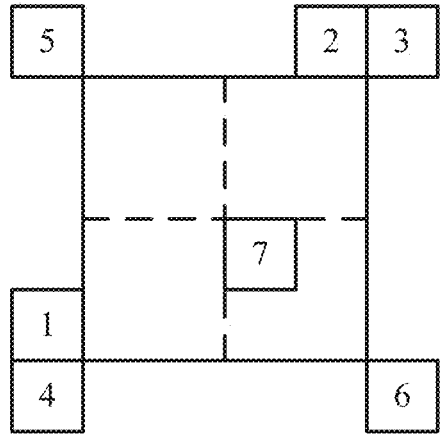
FIG. 3 is a schematic diagram of adjacent positions of a current block for deriving spatial motion information and temporal motion information.

A merge motion information candidate list is denoted as mergeCandList. When constructing mergeCandList, spatial motion information prediction based on positions 1 to 5 in FIG. 3 is first checked, and then temporal motion information prediction is checked. During checking temporal motion information prediction, if position 6 is available, the temporal motion information prediction is derived from position 6, which can also be referred to as derivation, i.e., the temporal motion information is calculated step by step based on position 6. Position 6 being available means that position 6 does not exceed the boundary of the picture or sub-picture and is in the same CTU row as the current block. For more details, references can be made to the relevant standard document. If position 6 is unavailable, the temporal motion information prediction is derived from position 7. Position 6 can be represented by coordinates (xColBr, yColBr), and position 7 can be represented by coordinates (xColCtr, yColCtr).

A specific method for determining the spatial motion information is as follows. The derivation of spatial motion information of position 2 in FIG. 3 is taken as an example, position 2 is denoted as $B_1$, or a block at position 2 is denoted as $B_1$. The following information may be derived: an available flag availableFlag$B_1$, a reference picture index refIdxLX$B_1$, a reference picture list use flag predFlagLX$B_1$, an MV mvLX$B_1$, where availableFlag$B_1$ indicates whether the spatial motion information of $B_1$ is available, refIdxLX$B_1$, predFlagLX$B_1$, and mvLX$B_1$ are combined together to form motion information, and X=0 . . . 1.

Coordinates of the top-left corner of the current block relative to the top-left corner of the current picture is denoted as (xCb, yCb), the width of the current block is denoted as cb Width, and the height of the current block is denoted as cbHeight.

Coordinates (xNbB$_1$, yNbB$_1$) in an adjacent block B$_1$ are set to (xCb+cbWidth−1, yCb−1). Whether a block where (xNbB$_1$, yNbB$_1$) is located is available is determined. A method for determination is as follows. If the block where (xNbB$_1$, yNbB$_1$) is located has been coded and is inter-coded, the block is available. Otherwise, the block is unavailable. Certainly, there may also be additional determination conditions. For example, if xCb>>Log2ParMrgLevel is equal to xNbB$_1$>>Log2ParMrgLevel and yCb>>Log2ParMrgLevel is equal to yNbB$_1$>>Log2ParMrgLevel, the block is unavailable, where Log2ParMrgLevel is a variable determined according to a sequence-level parameter, and ">>" indicates a right shift operation.

If the block where (xNbB$_1$, yNbB$_1$) is located is unavailable, a value of availableFlagB$_1$ is set to 0, a horizontal component and a vertical component of mvLXB$_1$ are set to 0, a value of refIdxLXB$_1$ is set to −1, and a value of predFlagLXB$_1$ is set to 0, where X=0 . . . 1.

Otherwise, the value of availableFlagB$_1$ is set to 1, and assignment may be performed as follows.

$$mvLXB_1 = MvLX[xNbB_1][yNbB_1]$$

$$refIdxLXB_1 = RefIdxLX[xNbB_1][yNbB_1]$$

$$predFlagLXB_1 = PredFlagLX[xNbB_1][yNbB_1]$$

One understanding is to use motion information at $(xNbB_1, yNbB_1)$ for the spatial motion information prediction based on position $B_1$, and the spatial motion information prediction based on other positions may also be derived similarly.

Temporal Motion Information Derivation

Figure 4:
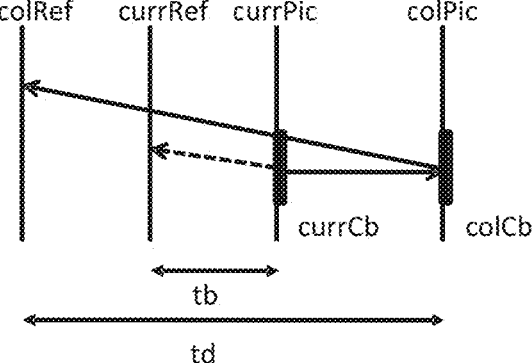
FIG. 4 is a schematic diagram illustrating calculation of a motion vector (MV) from a current block to a reference block according to an MV from a collocated block to a collocated reference block.

As illustrated in FIG. 4, currPic represents the current picture, currCb represents the current block, currRef represents the reference picture of the temporal motion information of the current block, colCb represents the collocated block, colPic represents the picture where the collocated block is located, and colRef represents the reference picture of the motion information used by the collocated block. During temporal motion information derivation, colCb is first found in colPic according to position information, and motion information of colCb is then identified. As illustrated in FIG. 4, the motion information of colCb is a motion vector illustrated as a solid line from the colPic to the colRef. The motion vector illustrated as the solid line is scaled to a motion vector from currPic to currRef illustrated as a dashed line to obtain the temporal motion information. tb is a variable determined based on a difference between a POC of currPic and a POC of currRef, and td is a variable determined based on a difference between a POC of colPic and a POC of colRef. The motion vector is scaled according to tb and td. FIG. 4 illustrates unidirectional motion information, or a scaled motion vector. It can be understood that temporal motion information can utilize bidirectional motion information.

A specific example of temporal motion information derivation is illustrated as follows. Taking temporal motion information derivation based on position 6 in FIG. 3 as an example, position 6 or the block at position 6 in the reference picture is denoted as Col, which is short for "collocated". This block is referred to as the collocated block, and the reference picture is referred to as the collocated picture. The following information is derived: an available flag availableFlagCol, a reference picture index refIdxLXCol, a reference picture list use flag predFlagLXCol, and a motion vector mvLXCol. The availableFlagCol indicates whether the temporal motion information of Col is available, and the reference picture index refIdxLXCol, the reference picture list use flag predFlagLXCol, and the motion vector mvLXCol together constitute the motion information, where $X=0 \ldots 1$.

The coordinates (xColBr, yColBr) of position 6 are calculated as (xCb+cbWidth, yCb+cbHeight). If the coordinates (xColBr, yColBr) meet the requirements, such as not exceeding the range of the current picture or sub-picture or not exceeding the range of the CTU row where the current block is located, the coordinates (xColBr, yColCb) of the collocated block is calculated as ((xColBr>>3)<<3, (yColBr>>3)<<3). The current block is denoted as currCb, the collocated block in the collocated picture ColPic is denoted as colCb, and colCb is a block covering (xColCb, yColCb). currPic represents the current picture. The reason for right-shifting (>>) by 3 bits and then left-shifting (<<) by 3 bits in calculating the coordinates is that the motion information in the collocated picture in this example is stored based on an 8×8 minimum storage unit (to save cache space, the granularity of caching reference picture motion information can be coarser). Right-shifting by 3 bits and then left-shifting by 3 bits changes the last 3 bits to 0. For example, 1010 is the binary representation of 10. After right-shifting by 3 bits and then left-shifting by 3 bits, it becomes 1000, which is the binary representation of 8. Different implementations may differ in conversion of coordinates.

For the convenience of description, some simplified assumptions are made here. In this example, it is assumed that motion information of a collocated block and temporal motion information to be derived only use one reference picture list L0. In this example, X that appears below is always set to 0. However, it may be noted that in some scenarios, the motion information of the collocated block and the temporal motion information to be derived are actually allowed to use two reference picture lists. Moreover, forward or backward motion information of temporal motion information derived according to forward or backward motion information of the collocated block can be combined in several manners, which is not limited in the present disclosure, and only the simplest example is used for illustration. For simplicity, refIdxLX is also set to 0, and refIdxLX can have multiple possible values, which are not limited in the disclosure, and only the simplest example is used for illustration.

mvLXCol and available FlagCol are derived as follows.

If colCb is encoded in an intra, IBC, or palette mode, a horizontal component and a vertical component of mvLXCol are set to 0, and availableFlagCol is set to 0, in which case the collocated block is considered not available.

Otherwise, availableFlagCol is set to 1. The motion vector mvCol, the reference picture index refIdxCol, and the reference picture list indicator listCol are derived as follows. mvCol, refIdxCol, and listCol constitute the motion information of the collocated block for scaling. mvCol, refIdxCol, and listCol are set to mvL0Col [xColCb][yColCb], refIdxL0Col[xColCb][yColCb], and L0, respectively.

predFlagLXCol is set to 1 mvLXCol is derived as follows.

refPicList [listCol][refIdxCol] is the reference picture of the motion information of the collocated block colCb, i.e. colRef in the figure. RefPicList[X][refIdxLX] is the reference picture of the temporal motion information, i.e. currRef in the figure. The POC distance colPocDiff between ColPic and refPicList [listCol] [refIdxCol] is calculated, and the POC distance currPocDiff between currPic and RefPicList[X][refIdxLX] is calculated.

colPocDiff=DiffPicOrderCnt (ColPic, refPicList[listCol] [refIdxCol])

currPocDiff=DiffPicOrderCnt (currPic, RefPicList[X][refIdxLX])

If colPocDiff is equal to currPocDiff:

$$mvLXCol = \text{Clip3}(-131072, 131071, mvCol)$$

Otherwise, mvLXCol is scaled according to mvCol:

$$tx = (16384 + (\text{Abs}(td) \gg 1))/td$$

$$distScaleFactor = \text{Clip3}(-4096, 4095, (tb * tx + 32) \gg 6)$$

-continued $$mvLXCol = \text{Clip3}(-131072, 131071,$$

$$(distScaleFactor * mvCol + 128 - (distScaleFactor * mvCol >= 0)) \gg 8)$$

Where:

td=Clip3 (−128, 127, colPocDiff)

tb=Clip3 (−128, 127, currPocDiff)

Noted that clip3 is a clipping function, and the values such as −131072, 131071, −4096, and 4095 in clip3 are related to data precision. These values can be different under different precision specifications. The above operations can be referred to in relevant standards.

When various candidate motion information is added to mergeCandList, in order to prevent same motion information or too similar motion information from being added to mergeCandList, sameness check or similarity check may be performed. In this way, more usable candidates may be added to mergeCandList.

Taking motion information in VVC as an example, a method for determining whether the motion information is the same is elaborated first. The motion information in VVC includes predFlagLX, refIdxLX, and mvLX, where X=0 . . . 1. In the present disclosure, two motion information are denoted as mi0 and mi1 respectively. A method for determining whether the two motion information are the same is as follows. If mi0. predFlagLX=mi1. predFlagLX, mi0. refIdxLX=mi1. refIdxLX, and mi0. mvLX=mi1. mvLX holds for X=0 and X=1, mi0 and mi1 are the same. Assume that if predFlagLX is 0, corresponding refIdxLX and mvLX are preset values, that is, the corresponding refIdxLX and mvLX are not random values.

Alternatively, when predFlagLX is 1, comparison of refIdxLX and mvLX is performed. When predFlagLX is 0, comparison of refIdxLX and mvLX is omitted. If there is a same reference picture in two reference picture lists, two motion information may direct to a same reference picture even if predFlagLX and refIdxLX are different, and if two corresponding mvLX are the same, two motion information may actually be the same. A reference picture indexed as refIdxLX in a reference picture list LX is denoted as refPicList[LX][refIdxLX]. Because a same reference picture generally does not appear twice in one reference picture list, two unidirectional motion information with different reference picture lists are taken as an example. For example, one of mi0.predFlagL0 and mi0.predFlagL1 is 1 and the other is 0, and the one with value 1 is denoted as corresponding to list A. One of mi1.predFlagL0 and mi1.predFlagL1 is 1 and the other is 0, and the one with value 1 is denoted as corresponding to list B. If mi0.refPicList[LA][refIdxLA] is equal to mi1.refPicList[LB][refIdxLB] and mi0.mvLA is equal to mi1.mvLB, the two motion information are the same. In the above two methods, one is to directly compare various parameters, and the other is to compare the reference pictures derived.

The following will introduce the similarity of two motion information. The motion information in VVC includes predFlagLX, refIdxLX, and mvLX, where X=0 . . . 1. In the present disclosure, two motion information are denoted as mi0 and mi1 respectively. A method for determining whether the two motion information are similar is as follows. If mi0. predFlagLX=mi1. predFlagLX, mi0. refIdxLX=mi1. refIdxLX, and diff (mi0. mvL X, mi1. mvLX)<diffTh holds for X=0 and X=1, mi0 and mi1 are similar. Assume that if predFlagLX is 0, corresponding refIdxLX and mvLX are preset values, that is, the corresponding refIdxLX and mvLX are not random values.

Alternatively, when predFlagLX is 1, comparison of refIdxLX and mvLX is performed. When predFlagLX is 0, comparison of refIdxLX and mvLX is omitted. If there is a same reference picture in two reference picture lists, two motion information may direct to a same reference picture even if predFlagLX and refIdxLX are different, and if two corresponding mvLX are similar, two motion information may actually be similar. A reference picture indexed as refIdxLX in a reference picture list LX is denoted as refPicList[L X][refIdxLX]. Because a same reference picture generally does not appear twice in one reference picture list, two unidirectional motion information with different reference picture lists are taken as an example. For example, one of mi0.predFlagL0 and mi0.predFlagL1 is 1 and the other is 0, and the one with value 1 is denoted as corresponding to list A. One of mi1.predFlagL0 and mi1.predFlagL1 is 1 and the other is 0, and the one with value 1 is denoted as corresponding to list B. If mi0.refPicList[LA][refIdxLA] is equal to mi1.refPicList [LB][refIdxLB] and diff (mi0.mvLX, mi1.mvLX)<diffTh, the two motion information are similar. diff(mi0.mvLX, mi1.mvLX) may indicate a difference between the two MVs, such as a sum of an absolute value of a difference between the horizontal components of the two MVs and an absolute value of a difference between the vertical components of the two MVs, or a maximum of the absolute value of the difference between the horizontal components of the two MVs and the absolute value of the difference between the vertical components of the two MVs. diffTh is a threshold for determining similarity. If the difference is less than diffTh, the two motion vectors (information) are considered similar. Otherwise, the two motion vectors (information) are considered dissimilar. In the above two methods, one is to directly compare various parameters, and the other is to compare the reference pictures derived.

Figure 5:
FIGS. 5, 6, and 7 are three pictures each illustrating motion from right to left.
Figure 6:
Figure 7:
Figure 8:
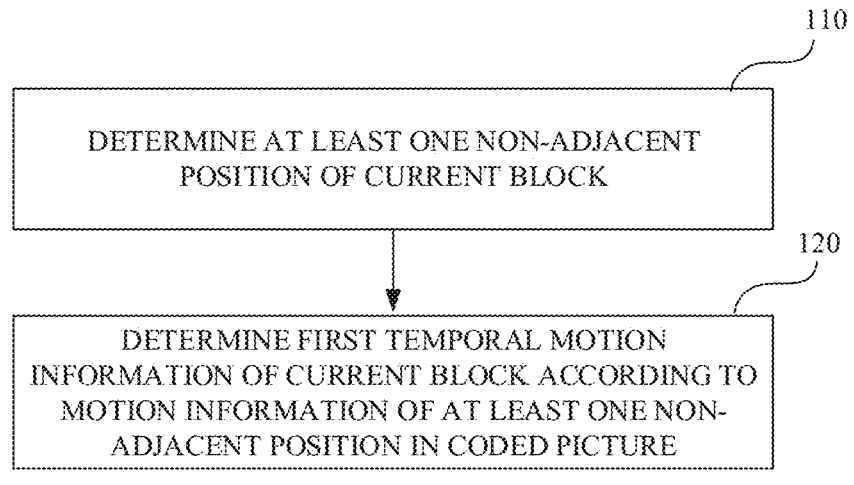
FIG. 8 is a flowchart of a method for temporal motion information prediction according to an embodiment of the present disclosure.

A video coding order is generally from left to right and from top to bottom. For example, in a slice, coding starts from the first CTU at the top-left corner and then to the right. After a CTU row is processed, coding continues from the first CTU on the left of the second row. Inside a CTU, coding also starts from left to right and from top to bottom. As a result, related information from the left and the top may be easier to obtain, while related information from the right and the bottom may be more difficult to obtain. An important information among the related information is motion information. Motion may be in any direction. Some motion may be from left to right, and some may be from right to left. A simple scenario is taken as an example. Under the low delay coding configuration, a picture is coded in chronological order. If an object moves from right to left and the object is not included in a collocated block at position 6 used for deriving the temporal motion information, motion information of the object may not be predicted for the current block. Furthermore, if some motion cannot be obtained from a coded part of the current picture and a position adjacent to a bottom-right corner of the current block, the motion information may not be predicted. For example, a rider moves from right to left in a picture RaceHorses in FIG. 5, a person moves from bottom right to top left in a picture BasketballDrill in FIG. 6, and a car moves from top right to bottom left in a picture BQTerrace in FIG. 7. In these scenarios, such motion information may not be well predicted by using existing methods for motion information prediction.

If an object is not included in the coded part, motion information of the object may be difficult to obtain by performing spatial motion information prediction on the current block. In this case, temporal motion information prediction may be performed. The position adjacent to the bottom-right corner of the current block may be used for the temporal motion information prediction. However, because the object may not be included in the collocated block at the position, motion information at one position may not be enough even under the random access configuration.

Especially for a GPM mode, in the GPM mode, some partitions simulate edges of two objects. If there is an object at the top-left corner and another object at the bottom-right corner, related information of the object at the top-left corner is easier to obtain, while related information of the another object at the bottom-right corner is more difficult to obtain. GPM may not be used due to failure to obtain motion information of the another object at the bottom-right corner.

To solve the above problem, the temporal motion information prediction may be performed by using one or more positions not adjacent to the current block.

A method for temporal motion information prediction is provided in an embodiment of the present disclosure. The method includes the following.

At S110, at least one non-adjacent position of a current block is determined.

At S120, first temporal motion information of the current block is determined according to motion information of the at least one non-adjacent position in a coded picture.

In the present disclosure, non-adjacent position-based temporal motion information prediction is referred to as non-adjacent temporal motion information prediction (NATMVP). Although use of motion vector instead of motion information herein is to be consistent with a customary expression, it may be noted that the motion vector herein also implies reference picture information, such as a reference picture index and a reference picture list use flag. In the present disclosure, the first temporal motion information is also referred to as temporal motion information determined through the NATMVP.

In the present disclosure, motion information of the current block determined through the temporal motion information prediction is referred to as temporal motion information of the current block, and motion information of the current block determined through spatial motion information prediction is referred to as spatial motion information of the current block.

In an exemplary embodiment of the present disclosure, the method for temporal motion information prediction further includes adjacent position-based temporal motion information prediction, that is, temporal motion information prediction performed based on an adjacent position of the current block (which is also abbreviated as TMVP). When the temporal motion information cannot be obtained from the adjacent position of the current block, the temporal motion information may be obtained from the inside of the current block.

When the temporal motion information prediction is performed based on a non-adjacent position of the current block, a corresponding collocated block in a reference picture of the current block may be determined according to coordinates of the non-adjacent position (where the collocated block is a CU or a minimum storage unit that includes the non-adjacent position in the reference picture, and the reference picture is considered as a collocated picture), and motion information of the collocated block is extracted and an MV in the motion information is scaled to obtain the temporal motion information of the current block. Because the temporal motion information is derived based on the non-adjacent position, the non-adjacent position is also referred to as position for deriving the temporal motion information in the present disclosure.

In the present disclosure, spatial motion information prediction performed according to a position adjacent to the current block (i.e. an adjacent position of the current block) is referred to as spatial motion information predictor (SMVP). Similarly, spatial motion information prediction performed according to a position not adjacent to the current block (i.e. a non-adjacent position of the current block) is referred to as non-adjacent spatial motion information predictor (NASMVP).

In an exemplary embodiment of the present disclosure, the at least one non-adjacent position includes any one or more of non-adjacent positions in the following directions: a non-adjacent position on the right of the current block; a non-adjacent position on the bottom of the current block; or a non-adjacent position on the bottom right of the current block.

Figure 10:
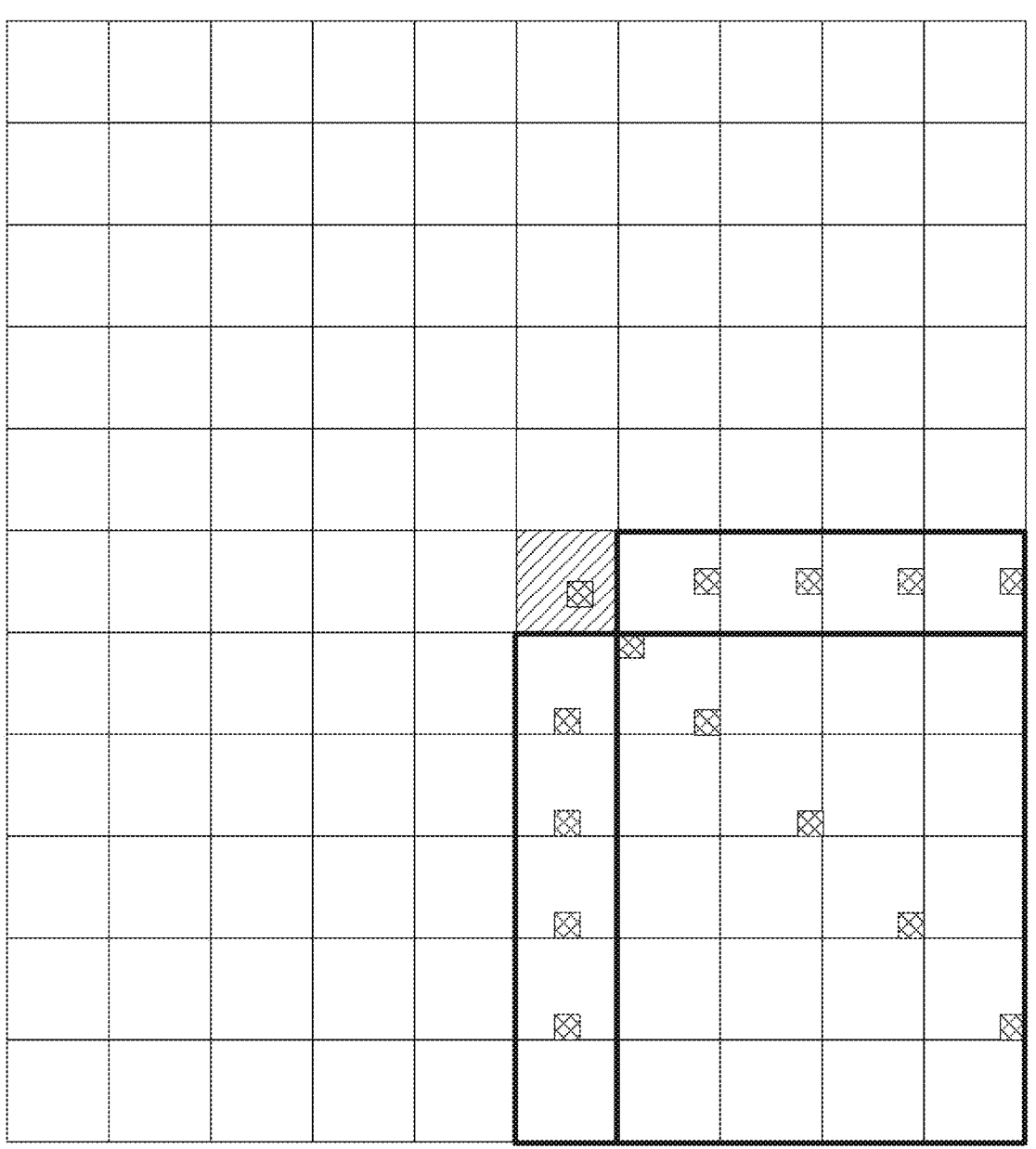
FIG. 10 is a schematic diagram of an example of non-adjacent positions for deriving temporal motion information according to an embodiment of the present disclosure.

As illustrated in FIG. 10, a large square indicates a 16×16 block, and a current block is located at the center. A small square with section lines in FIG. 10 is a 4×4 small block and corresponds to a minimum storage unit. For the sake of convenience, the small square in the FIG. 10 indicates a non-adjacent position whose coordinates fall within the small square.

In an example, the non-adjacent position on the right of the current block refers to a non-adjacent position whose horizontal coordinate is greater than xCb+cbWidth and whose vertical coordinate is in a range of [yCb, yCb+cbHeight−1]. The non-adjacent position on the bottom of the current block refers to a non-adjacent position whose vertical coordinate is greater than yCb+cbHeight and whose horizontal coordinate is in a range of [xCb, xCb+cbWidth−1]. The position on the bottom right of the current block is a non-adjacent position whose horizontal coordinate is greater than xCb+cb Width and whose vertical coordinate is greater than yCb+cbHeight. For the above non-adjacent positions, reference can be made to three thick boxes in FIG. 10.

Figure 11:
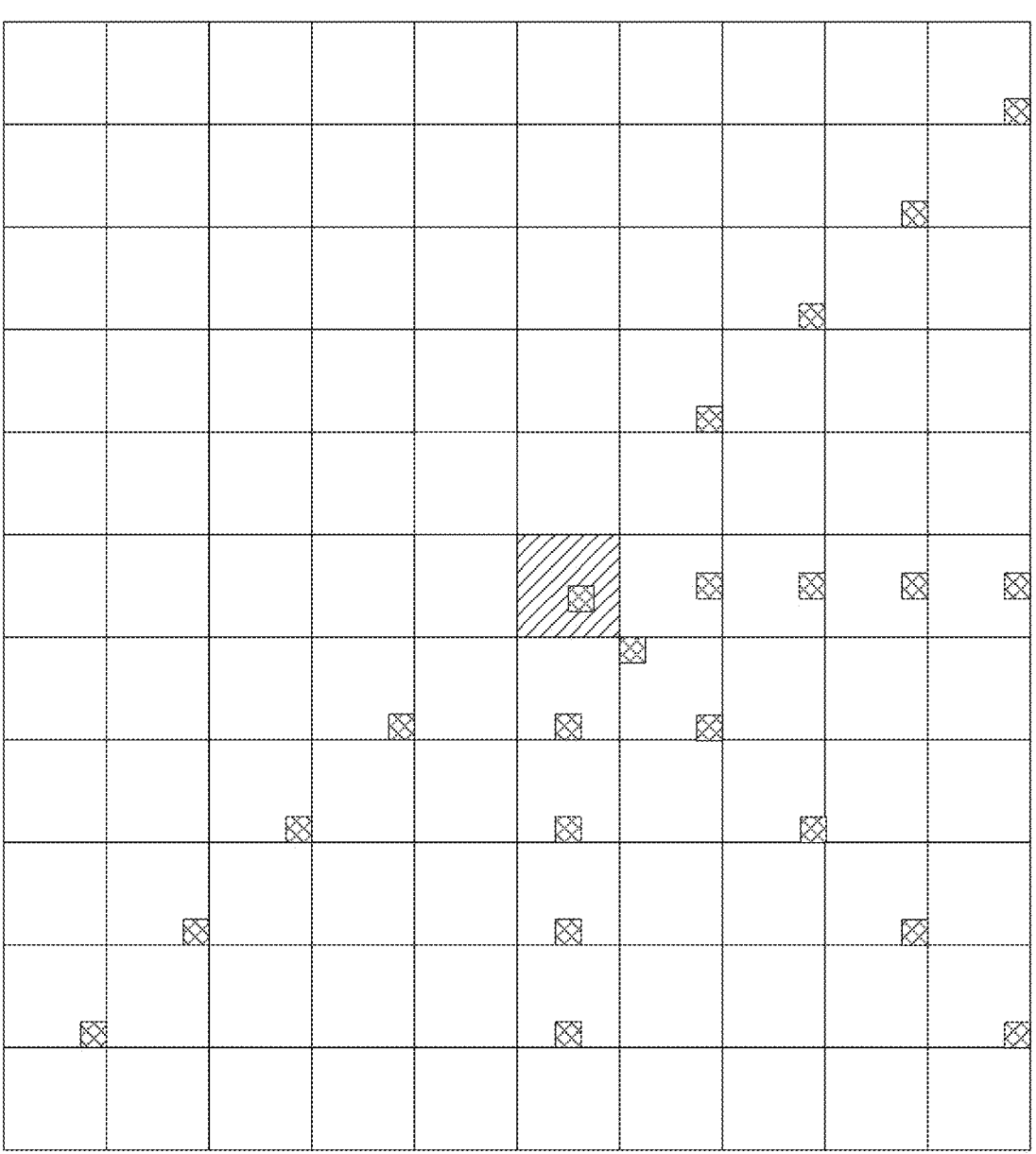
FIG. 11 is a schematic diagram of another example of non-adjacent positions for deriving temporal motion information according to an embodiment of the present disclosure.

A position adjacent to a bottom-right corner of the current block in FIG. 10 is a position used for TMVP. If the position adjacent to the bottom-right corner of the current block is unavailable, a position at the center of the current block may be used. Consider that positions on the top right and the bottom left of the current block used for NASMVP are always unavailable. In another embodiment, the positions on the top right and the bottom left of the current block as illustrated in FIG. 11 may also be used for NATMVP. In other embodiments, positions on all sides around the current block, including non-adjacent positions on at least one direction of the left, the top, or the top left of the current block, may be used for NATMVP, and the non-adjacent positions in the reference picture are all coded. In an actual application, only some positions may be used. It may be noted that specific coordinates of a non-adjacent position actually used in embodiments of the present disclosure may be changed based on the illustrated. For example, a "+1" or "−1" operation may be performed on at least one of a horizontal coordinate or a vertical coordinate of the non-adjacent position. As illustrated, a small square corresponding to the non-adjacent position may change from a bottom-left corner of a large square to a top-left corner of a next large square, etc.

In an exemplary embodiment of the present disclosure, a horizontal distance and/or a vertical distance between the non-adjacent position and a set sample in the current block is preset fixed values; or the horizontal distance and/or the vertical distance between the non-adjacent position and the set sample in the current block is variable and is determined according to the following parameters or any combination of the following parameters: a size of the current block; a parameter of a current picture sequence; a sequence-level flag of the current picture sequence; a picture-level flag of a current picture; or a slice-level flag of the current picture.

Figure 12:
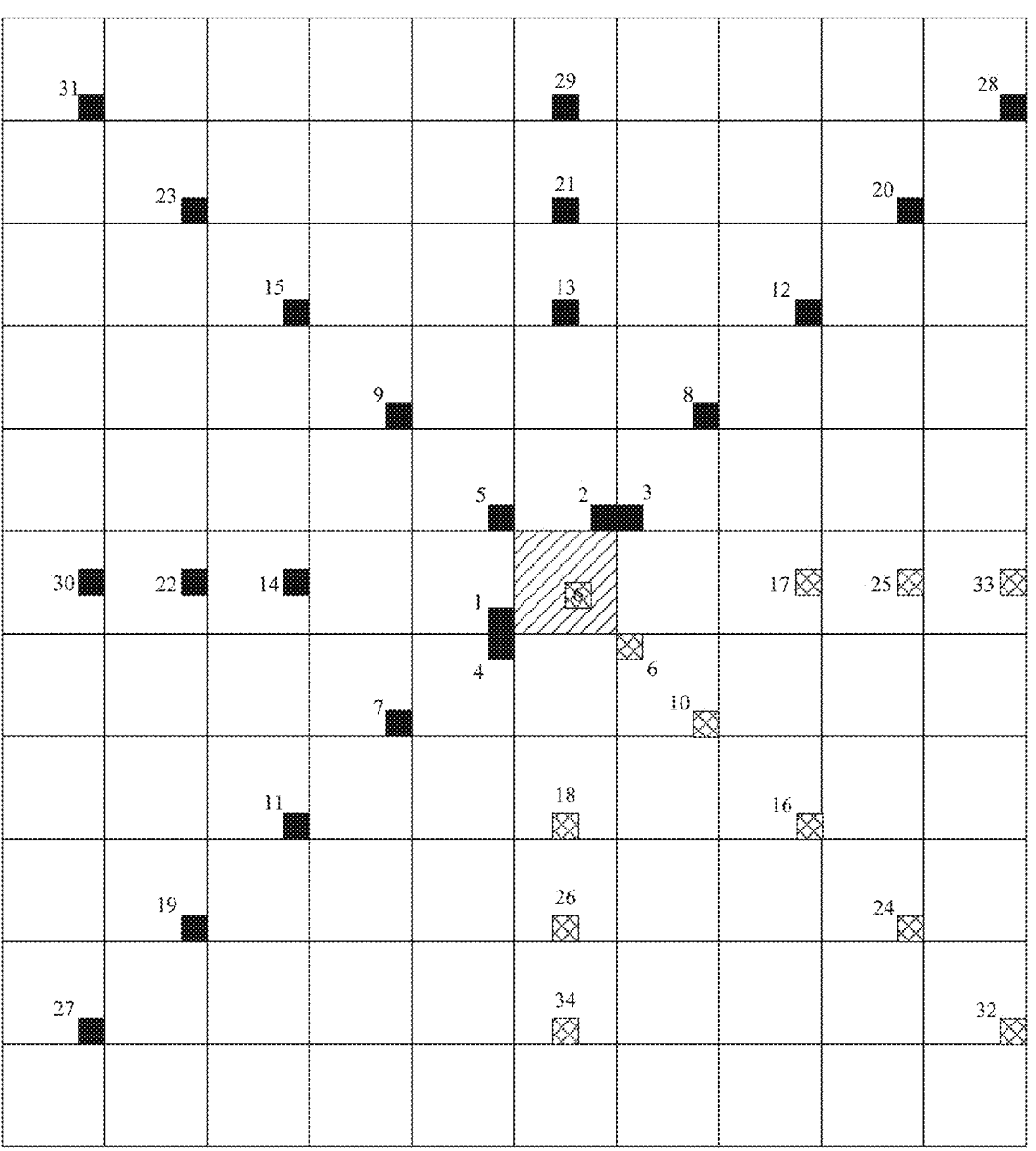
FIG. 12 is a schematic diagram of various positions and an order thereof for deriving spatial motion information and temporal motion information according to an embodiment of the present disclosure.

In an example, a distance between the non-adjacent position and the set sample in the current block in a horizontal direction (i.e., the horizontal distance) and a distance between the non-adjacent position and the set sample in the current block in a vertical direction (i.e., the vertical distance) are preset. As illustrated in FIG. 12, a horizontal distance and a vertical distance between position 10 and the bottom-right corner of the current block are 16 pixels, a horizontal distance and a vertical distance between position 16 and the bottom-right corner of the current block are 16*2 pixels, i.e., 32 pixels, and so on.

In an example, the non-adjacent position may be determined according to the position of the current block. Coordinates of the top-left corner of the current block relative to a top-left corner of the current picture is denoted as (xCb, yCb), cbWidth is the width of the current block, and cbHeight is the height of the current block. In this example, the horizontal distance and/or the vertical distance between the non-adjacent position and the set sample in the current block may be determined according to the size of the current block. As illustrated in FIG. 12, the horizontal distance between position 10 and the bottom-right corner of the current block is cbWidth, the vertical distance between position 10 and the bottom-right corner of the current block is cbHeight, and coordinates of position 10 are (xCb+2*cbWidth−1, yCb+2*cbHeight−1); the horizontal distance between position 16 and the bottom-right corner of the current block is 2*cbWidth, the vertical distance between position 16 and the bottom-right corner of the current block is 2*cbHeight, and coordinates of position 16 are (xCb+3*cbWidth−1, yCb+3*cbHeight−1); and so on.

In an example, the horizontal distance and/or the vertical distance between the non-adjacent position and the set sample in the current block may be determined according to the parameter (such as resolution) of the current picture sequence. For example, in a 1920×1080 current picture sequence, the horizontal distance and the vertical distance between position 10 in FIG. 12 and the bottom-right corner of the current block are 32 pixels; and in a 1280×720 current picture sequence, the horizontal distance and the vertical distance between position 10 in FIG. 12 and the bottom-right corner of the current block are 16 pixels.

In an example, the horizontal distance and/or the vertical distance between the non-adjacent position and the set sample in the current block may be determined according to a flag, such as the sequence-level (sequence parameter set) flag of the current picture sequence, the picture-level flag, or the slice-level (slice header) flag. In an example, the sequence-level flag, the picture-level flag, or the slice-level flag (which may be a 1-bit flag) being 0 indicates that the horizontal distance and the vertical distance between position 10 in FIG. 12 and the bottom-right corner of the current block are 32 pixels, and the sequence-level flag, the picture-level flag, or the slice-level flag (which may be a 1-bit flag) being 1 indicates that the horizontal distance and the vertical distance between position 10 in FIG. 12 and the bottom-right corner of the current block are 16 pixels. The sequence-level flag, the picture-level flag, and the slice-level flag may be newly added, or reused existing flags indicating a value selected form multiple preset values of the horizontal distance and/or the vertical distance between the non-adjacent position and the set sample in the current block.

In an exemplary embodiment of the present disclosure, the coded picture is the reference picture of the current block. The first temporal motion information of the current block is determined according to the motion information of the at least one non-adjacent position in the coded picture as follows. A collocated block corresponding to the non-adjacent position in the reference picture is determined. Motion information of the collocated block is determined. The first temporal motion information of the current block is obtained by scaling an MV in the obtained motion information. In this embodiment, the collocated block corresponding to the non-adjacent position in the reference picture is a CU or a minimum storage unit at the non-adjacent position in the reference picture. In other words, if coordinates of the non-adjacent position are in a range of coordinates of a CU or a minimum storage unit in the reference picture, the CU or the minimum storage unit is the collocated block corresponding to the non-adjacent position in the reference picture.

In an exemplary embodiment of the present disclosure, the non-adjacent position is within a range of an LCU or a coding tree unit (CTU) where the current block is located, or the non-adjacent position is within a range of an LCU row or a CTU row where the current block is located. In consideration of storage cost, a decoding apparatus can generally buffer only a portion of motion information stored in a collocated picture, and therefore a range of the motion information in the collocated picture that can be read for the current block may be limited. For example, only the motion information stored in the collocated picture at a position corresponding to the current CTU can be read for the current block, or only the motion information stored in the collocated picture at a position corresponding to the current CTU row can be read for the current block. Such a limitation is also applicable to all the above methods. If a position used for deriving temporal motion information is out of a range available to the current block, such as out of the current CTU or the current CTU row, the collocated block at the position is unavailable, and the derivation of the temporal motion information at the position may be exited.

In an exemplary embodiment of the present disclosure, the horizontal distance and/or the vertical distance between the non-adjacent position and the set sample in the current block may also be determined according to a combination of multiple parameters. For example, when the sequence-level flag of the current picture sequence is 1 and the size of the current block is 16×16, the horizontal distance and the vertical distance are set to 16. Different combinations correspond to different horizontal distances and vertical distances.

In an exemplary embodiment of the present disclosure, the method for temporal motion information prediction further includes adjacent position-based temporal motion information prediction. In other words, the method includes NATMVP and TMVP.

In an exemplary embodiment of the present disclosure, when there may be at least three positions in a same direction for deriving the first temporal motion information, distances between adjacent positions among the at least three positions are the same, or the distances between the adjacent positions among the at least three positions is variable and a distance between two adjacent positions farther from the current block is larger. In other words, the distances between positions in the same direction may be fixed or variable. Reference can be made to FIG. 12, there are 3 positions on the right of the current block, that is, position 17, position 25, and position 33. A distance between position 17 and position 25 is equal to a distance between position 25 and position 33. That is, position 17, position 25, and position 33 are set at an equal distance. In another example, the distance between position 25 and position 33 may be larger than the distance between position 17 and position 25.

In an exemplary embodiment of the present disclosure, the at least one non-adjacent position includes any one or more of: a first position with coordinates (xCb+2*k_cbWidth−1, yCb+2*k_cbHeight−1), (xCb+2*k_cbWidth, yCb+2*k_cbHeight−1), (xCb+2*k_cbWidth−1, yCb+2*k_cbHeight), or (xCb+2*k_cbWidth, yCb+2*k_cbHeight); a second position with coordinates (xCb+3*k_cbWidth−1, yCb+3*k_cbHeight−1), (xCb+3*k_cbWidth, yCb+3*k_cbHeight−1), (xCb+3*k_cbWidth−1, yCb+3*k_cbHeight), or (xCb+3*k_cbWidth, yCb+3*k_cbHeight); a third position with coordinates (xCb+3*k_cbWidth−1, yCb+k_cbHeight/2−1), (xCb+3*k_cbWidth, yCb+k_cbHeight/2−1), (xCb+3*k_cbWidth−1, yCb+k_cbHeight/2), or (xCb+3*k_cbWidth, yCb+k_cbHeight/2); a fourth position with coordinates (xCb+k_cbWidth/2, yCb+3*k_cbHeight−1), (xCb+k_cbWidth/2, yCb+3*k_cbHeight), (xCb+k_cbWidth/2−1, yCb+3*k_cbHeight−1), or (xCb+k_cbWidth/2−1, yCb+3*k_cbHeight); a fifth position with coordinates (xCb+2*k_cbWidth−1, yCb+k_cbHeight/2−1), (xCb+2*k_cbWidth, yCb+k_cbHeight/2−1), (xCb+2*k_cbWidth−1, yCb+k_cbHeight/2), or (xCb+2*k_cbWidth, yCb+k_cbHeight/2); a sixth position with coordinates (xCb+k_cbWidth/2, yCb+2*k_cbHeight−1), (xCb+k_cbWidth/2, yCb+2*k_cbHeight), (xCb+k_cbWidth/2−1, yCb+2*k_cbHeight−1), or (xCb+k_cbWidth/2−1, yCb+2*k_cbHeight); a seventh position with coordinates (xCb+k_cbWidth, yCb+2*k_cbHeight), (xCb+k_cbWidth, yCb+2*k_cbHeight−1), (xCb+k_cbWidth−1, yCb+2*k_cbHeight), or (xCb+k_cbWidth−1, yCb+2*k_cbHeight−1); or an eighth position with coordinates (xCb+2*k_cbWidth, yCb+k_cbHeight), (xCb+2*k_cbWidth−1, yCb+k_cbHeight), (xCb+2*k_cbWidth, yCb+k_cbHeight−1), or (xCb+2*k_cbWidth−1, yCb+k_cbHeight−1). xCb is a horizontal coordinate of a top-left corner of the current block, yCb is a vertical coordinate of the top-left corner of the current block, k_cbWidth is a width, ½ width, ¼ width, or double width of the current block, k_cbHeight is a height, ½ height, ¼ height, or double height of the current block, and "*" indicates multiplication operation.

Figure 13:
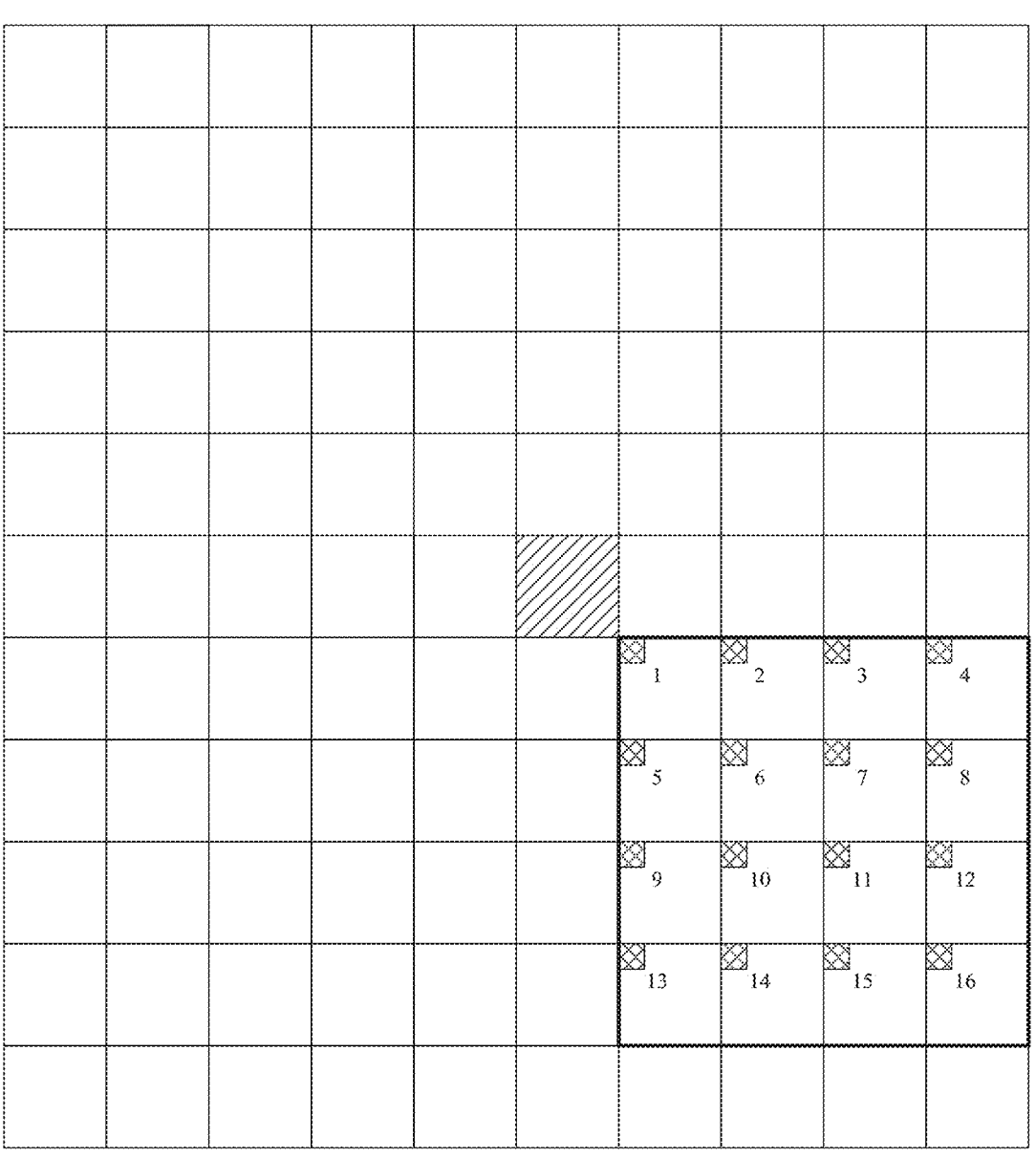
FIG. 13 is a schematic diagram of yet another example of non-adjacent positions for deriving temporal motion information according to an embodiment of the present disclosure.

As illustrated in FIG. 12 and FIG. 13, a position of coordinates (xCb+2*cbWidth−1, yCb+2*cbHeight−1) is indicated as position 10 in FIG. 12, a position of coordinates (xCb+3*cbWidth−1, yCb+3*cbHeight−1) is indicated as position 16 in FIG. 12, and other positions are not described one by one.

In an exemplary embodiment of the present disclosure, the method for temporal motion information prediction further includes adjacent position-based temporal motion information prediction. The adjacent position includes an adjacent position of the bottom-right corner of the current block, the non-adjacent position of the current block and the adjacent position of the bottom-right corner of the current block are distributed in an array, a top-left corner of the array is the adjacent position of the bottom-right corner of the current block, and different positions in the array are distributed on different minimum storage units in the coded picture.

Each position in the above array may be obtained by scanning in a set range. For example, scanning is performed in a certain order in a rectangular area as illustrated in a bottom-right corner of FIG. 13 to determine non-adjacent positions for temporal motion information prediction, and then the temporal motion information is determined according to the scanned positions.

The width and the height of the rectangular area in FIG. 13 may be preset. For example, the width and the height are 64 pixels. Alternatively, the width and the height of the rectangular area may be determined according to the size of the current block. For example, the width of the rectangular area is 4 times the width of the current block; and the height of the rectangular area is 4 times the height of the current block. Alternatively, the width and the height of the rectangular area may be determined according to the parameter of the current picture sequence. For example, the width and the height of the rectangular area in a 1920×1080 sequence are 64 pixels, and the width and the height of the rectangular area in a 1280×720 sequence are 32 pixels. Alternatively, the width and the height of the rectangular area may be determined according to the flag, such as the sequence-level (sequence parameter set) flag of the current sequence picture or the slice-level (slice header) flag of the current picture. For example, the flag being 0 indicates that the width and the height of the rectangular area are 64 pixels, and the flag being 1 indicates that the width and the height of the rectangular area are 32 pixels. The scanning order may be an order of raster scanning, i.e., the order as illustrated in FIG. 13, an order of zig-zag scanning, or other scanning orders.

The motion information of the collocated picture is stored in a minimum storage unit, such as a 4×4 block, an 8×8 block, or a 16×16 block. Only one motion information is stored in the minimum storage unit. Scanning may be performed at a granularity of minimum storage unit. Reflected in coordinates, if the minimum storage unit is an 8×8 block, a horizontal coordinate of a next scanning position in the horizontal direction is increased by 8, and a vertical coordinate of the next scanning position remains unchanged; and a horizontal coordinate of a next scanning position in the vertical direction remains unchanged, and a vertical coordinate of the next scanning position is increased by 8. The scanning granularity may also be related to the size of the current block. For example, a horizontal granularity is equal to the width of the current block, and a vertical granularity is equal to the height of the current block. Reflected in coordinates, the horizontal coordinate of the next scanning position in the horizontal direction is increased by the width of the current block, and the vertical coordinate remains unchanged; and the horizontal coordinate of the next scanning position in the vertical direction remains unchanged, and the vertical coordinate is increased by the height of the current block. The granularity may also be determined according to the parameter of the current picture sequence. For example, a granularity of horizontal scanning and a granularity of vertical scanning in the 1920×1080 current picture sequence are 16 pixels, and a granularity of horizontal scanning and a granularity of vertical scanning in the 1280×720 current picture sequence are 32 pixels. The granularity may also be determined according to the flag, such as the sequence-level flag of the current picture sequence, the picture-level flag of the current picture, or the slice-level flag of the current picture. For example, the flag being 0 indicates that the granularity of the horizontal scanning and the granularity of the vertical scanning are 16 pixels, and the flag being 1 indicates that the granularity of the horizontal scanning and the granularity of the vertical scanning are 32 pixels.

During scanning, the number of temporal motion information candidates added in the method may be limited. In other words, during the temporal motion information prediction, it is not necessary to scan all positions in the rectangular area.

In the method for temporal motion information prediction in above embodiments of the present disclosure, the temporal motion information of the current block can be determined by using the non-adjacent position, which can effectively supplement motion information of some scenarios that cannot be covered by spatial motion information, such as motion information of motion from right to left, from the bottom right to the top left, from the bottom to the top, etc., thereby improving the compression efficiency. In the method for temporal motion information prediction in above embodiments of the present disclosure, the temporal motion information of the current block can also be effectively extracted by setting a direction of the non-adjacent position relative to the current block, the distances between non-adjacent positions, etc.

A method for candidate motion information list constructing is further provided in an embodiment of the present disclosure. As illustrated in FIG. 9, the method includes the following.

At S210, spatial motion information and temporal motion information of a current block are determined by performing spatial motion information prediction and temporal motion information prediction on the current block.

At S220, the spatial motion information and the temporal motion information are added to a candidate motion information list of the current block in a set order.

The temporal motion information prediction adopts the method for temporal motion information prediction in any embodiment of the present disclosure. The temporal motion information includes the first temporal motion information.

In an exemplary embodiment of the present disclosure, the method for candidate motion information list constructing is used in a Merge mode.

In HEVC and VVC, a motion information candidate list in the merge mode is a common scenario using motion information prediction. In embodiments of the present disclosure, the spatial motion information and the temporal motion information (also collectively referred to as candidate motion information) may be added to the candidate motion information list mergeCandList in a certain order (such as a correlation order). A possible process for constructing mergeCandList is to check whether each motion information candidate, such as spatial motion information at an adjacent position, temporal motion information at an adjacent position, spatial motion information at a non-adjacent position, temporal motion information at a non-adjacent position, history-based motion information, etc., is similar to motion information candidate that has been added or determined to be added to mergeCandList according to a preset threshold in a preset order. If a motion information candidate to be added to the list is not similar to any motion information candidate that has been added or determined to be added to mergeCandList, the motion information candidate is determined to be added to the list. Otherwise, the motion information candidate is determined not to be added to the list.

As for the correlation order, a closer distance to the current block leads to a stronger correlation, and with a same distance, the spatial motion information prediction is more relevant than the temporal motion information prediction. However, NATMVP can provide motion information in some directions that SMVP and NASMVP cannot provide, and how to add the candidates to mergeCandList needs to be considered.

In an exemplary embodiment of the present disclosure, the set order is determined according to one or more of the following rules: when a distance of the spatial motion information is less than or equal to a distance of the temporal motion information, the spatial motion information is to be preferentially added to the candidate motion information list; when the distance of the spatial motion information is larger than the distance of the temporal motion information, the temporal motion information is to be preferentially added to the candidate motion information list; when distances of multiple temporal motion information are different, temporal motion information with a smaller distance is to be preferentially added to the candidate motion information list; or when the distances of the multiple temporal motion information are the same, an order in which the multiple temporal motion information are added to the candidate motion information list is determined according to a statistical law of the temporal motion information.

The distance of the spatial motion information refers to a distance from a position where the spatial motion information is derived to the current block, and the distance of the temporal motion information refers to a distance from a position where the temporal motion information is derived to the current block, a distance from a position to the current block is determined according to a rectangular box which the position is located in or adjacent to, the current block is surrounded by the rectangular box and is at a center of the rectangular box, a width of the rectangular box is integer multiples of a width of the current block, a height of the rectangular box is integer multiples of a height of the current block, and a larger area of the rectangular box leads to a larger distance from the position to the current block. For example, as illustrated in FIG. 12, position 11, position 14, position 15, position 13, position 12, position 17, position 16, and position 18 are all considered to be positions having the same distance to the current block. The positions may include adjacent positions and non-adjacent positions. In the present disclosure, a horizontal coordinate deviation between the position and a nearest sample in the current block refers to an absolute value of a difference between a horizontal coordinate of the position and a horizontal coordinate of the nearest sample in the current block; and a vertical coordinate deviation between the position and the nearest sample in the current block refers to an absolute value of a difference between a vertical coordinate of the position and a vertical coordinate of the nearest sample in the current block.

As for the correlation order, reference can be made to an order of various positions as illustrated in FIG. 12. Small black squares in FIG. 12 indicate positions used for spatial motion information prediction, and small squares with section lines indicate positions used for temporal motion information prediction. As can be seen, when the distance of the spatial motion information is less than or equal to the distance of the temporal motion information, for example, position 16 is a position for temporal motion information prediction, position 11 is a position used for spatial motion information prediction, position 16 has the same distance to the current block with position 11, and therefore spatial motion information derived based on position 11 is to be preferentially added to the candidate motion information list. For another example, position 19 is a position used for spatial motion information prediction, a distance between position 19 and the current block is greater than a distance between position 16 and the current block, and therefore temporal motion information derived based on position 16 is to be preferentially added to the candidate motion information list over spatial motion information derived based on position 19. For yet another example, both position 10 and position 16 are positions used for deriving temporal motion information, position 10 has a smaller distance to the current block, and therefore temporal motion information derived based on position 10 is to be preferentially added to the candidate motion information list.

In an example, the first temporal motion information includes at least two of: first temporal motion information derived from a non-adjacent position of the bottom right of the current block; first temporal motion information derived from a non-adjacent position of the right of the current block; or first temporal motion information derived from a non-adjacent position of the bottom of the current block. When distances of multiple first temporal motion information are the same, the order in which the multiple first temporal motion information is added to the candidate motion information list is determined according to the statistical law of the temporal motion information as follows. The first temporal motion information derived from the non-adjacent position of the bottom right of the current block is to be preferentially added to the candidate motion information list over the first temporal motion information derived from the non-adjacent position of the right of the current block; and the first temporal motion information derived from the non-adjacent position of the right of the current block is to be preferentially added to the candidate motion information list over the first temporal motion information derived from the non-adjacent position of the bottom of the current block.

Reference can also be made to FIG. 12, position 18, position 16, and position 17 are all used for deriving the temporal motion information, and an order in which temporal motion information derived from position 18, temporal motion information derived from position 16, and temporal motion information derived from position 17 are added to the candidate motion information list is determined according to the statistical law of the temporal motion information. After research, the order is that the position on the bottom right is prioritized over the position on the right, and the position on the right is prioritized over the position on the bottom. Therefore, the temporal motion information derived from position 16 has the largest correlation, the temporal motion information derived from position 17 has the second largest correlation, and the temporal motion information derived from position 18 has the smallest correlation. The temporal motion information with larger correlation will be ranked first, i.e., will be preferentially added to the candidate motion information list.

As illustrated in FIG. 12, there are two positions 6. If position 6 on the bottom right of the current block is unavailable, it may be replaced by position 6 at the center of the current block. If position 6 at the bottom right of the current block is available, position 6 at the center of the current block is not used. In actual applications, for the compromise between performance and complexity, not so many candidates as illustrated in FIG. 12 may be used. Alternatively, more candidates may be used according to the above principle.

The positions used for deriving the spatial motion information in this embodiment are illustrated as the small black squares in FIG. 12. A large square with section lines in the middle is the current block, and five positions adjacent to the large square, namely position 1 to position 5, are used for the spatial motion information prediction to derive the spatial motion information. Outside these positions, some non-adjacent positions may be used for performing NASMVP. As illustrated in FIG. 12, non-adjacent positions on the bottom left, the left, the top left, the top, and the top right of the current block may be used for deriving the spatial motion information. Since blocks at the right, the bottom right, and the bottom have not been coded, these blocks cannot be used for the spatial motion information prediction. The non-adjacent positions have a certain distance from the current block. In an example, a distance between the position and the current block in the horizontal direction is related to the length of the current block, and a distance between the position and the current block in the vertical direction is related to the width of the current block. For example, the non-adjacent positions may be determined by expanding outward by the length and width of the current block, and positions in an inner layer are preferentially added to the list because of a closer distance.

FIG. 12 illustrates an example of spatial motion information prediction, where the spatial motion information is added to the list in the order as illustrated in FIG. 12, and correlation and the statistical law of motion are taken into account.

In an exemplary embodiment of the present disclosure, an order of most preceding first temporal motion information among the first temporal motion information is determined according to at least one of the following manners. In a GPM, a serial number set for the most preceding first temporal motion information is less than or equal to a maximum number of candidate motion information allowed to be added to the candidate motion information list. In a set high-speed motion scenario, the serial number set for the most preceding first temporal motion information is less than or equal to the maximum number of the candidate motion information allowed to be added to the candidate motion information list.

In the present disclosure, in order to more effectively utilize the temporal motion information of the non-adjacent position on some specific occasions and effectively make up for the deficiency of the spatial motion information prediction, in the GPM, the serial number set for the first temporal motion information is less than or equal to the maximum number of candidate motion information allowed to be added to the candidate motion information list. For example, if the maximum number of candidate motion information allowed to be added to the candidate motion information list is 6, the serial number of the first temporal motion information may be set to 6 or a value less than 6, where the serial number indicates an order in which the motion information is to be added to the candidate motion information list. If the serial number is 1, it indicates that the first temporal motion information is the first to be added to the candidate motion information list; if the serial number is 2, it indicates that the first temporal motion information is the second to be added to the candidate motion information list; and so on. Therefore, with this setting, it can be ensured that even if the motion information with the most preceding serial number is valid and added to the candidate motion information list, the first temporal motion information can also be added to the candidate motion information list. It may be noted that in these specific occasions, the first temporal motion information may be ensured to be added to the candidate motion information list by advancing the serial number of the first temporal motion information or increasing the maximum number of the candidate motion information allowed to be added to the candidate motion information list. For example, the maximum number is increased from 6 to 7 on the specific occasions. The high-speed motion scenario may be configured by a user or learned by a system itself.

When various candidate motion information is added to mergeCandList, in order to prevent same motion information or too similar motion information from being added to mergeCandList, sameness check or similarity check may be performed. In this way, more usable candidates may be provided by mergeCandList. For the temporal motion information prediction and the spatial motion information prediction, the above methods or standards for similarity detection may be different. For example, SMVP and NASMVP based on different positions may provide some similar motion information inside a same object, such as some gradual and subtle changes. However, the temporal motion information, especially NATMVP, requires "different" motion information. The "different" refers to motion information with a larger difference than "similar". A difference between "different" and "similar" may be reflected in different thresholds.

Various spatial motion information, temporal motion information, and other motion information are to be added to mergeCandList in a certain order. The sameness and similarity detection may be performed when constructing the candidate list. One method is to discard same or similar motion information candidates and not add them to merge-CandList. Different thresholds may be used for determining similarity when adding temporal motion information derived from the non-adjacent position. For example, a similarity threshold used for the temporal motion information derived from the non-adjacent position is larger than a similarity threshold used for the spatial motion information derived from the adjacent position (such as a threshold set for an MV).

In an exemplary embodiment of the present disclosure, the spatial motion information and the temporal motion information are added to the candidate motion information list of the current block in the set order as follows. Similarity check (including sameness check) is performed before the spatial motion information or the temporal motion information is added to the candidate motion information list. Based on a determination through the similarity check that the spatial motion information or the temporal motion information is not similar to any one of candidate motion information that has been added or determined to be added to the candidate motion information list, the spatial motion information or the temporal motion information is to be added to the candidate motion information list. A first similarity threshold θ1 is used when the similarity check is performed on the first temporal motion information, a second similarity threshold θ2 is used when the similarity check is performed on the spatial motion information, and θ1>θ2 or θ1=θ2.

In an exemplary embodiment of the present disclosure, the temporal motion information further includes temporal motion information determined by adjacent position-based temporal motion information prediction, a third similarity threshold θ3 is used when the similarity check is performed on the temporal motion information determined by the adjacent position-based temporal motion information prediction, and θ1>θ3 or θ1=θ3. In other words, in this embodiment, the similarity threshold set for the temporal motion information determined though the adjacent position-based temporal motion information prediction may be smaller than the similarity threshold set for the temporal motion information determined though the non-adjacent position-based temporal motion information prediction, so that the temporal motion information determined though the adjacent position-based temporal motion information prediction is more likely to pass the similarity check.

In an exemplary embodiment of the present disclosure, the first similarity threshold is determined according to one of the following parameters: a parameter of a current picture sequence, or a parameter of a current picture. In an example, the parameter of the current picture sequence includes sequence resolution. The parameter of the current picture includes any one or more of the following parameters: a picture width, a picture height, or the number of samples of the picture. The first similarity threshold includes multiple first similarity thresholds, and a larger first similarity threshold corresponds to a larger parameter value. In other words, in this embodiment, the first similarity threshold is related to some parameters of the sequence or the picture. It may be understood that the same motion will have a larger MV in a video with a higher resolution than in a video with a lower resolution. Therefore, the similarity threshold of the temporal motion information derived from the non-adjacent position may be set according to the parameters of the sequence or the picture, such as the resolution of the sequence, the width and/or the height of the picture, or the number of samples. For example, the threshold may be set to 64 in a 1920×1080 sequence, and set to 16 in a 1280×720 sequence. The threshold may be calculated according to the width and/or height of the picture. For example, the threshold is denoted as diffThT, the width of the picture is denoted as picWidth, the height of the picture is denoted as picHeight, and diffThT=picWidth*picHeight>>14, where ">>" indicates a right shift operation, i.e., a division operation by 2.

In an exemplary embodiment of the present disclosure, the first similarity threshold is determined according to a reference relationship of a current picture, where the reference relationship includes a unidirectional reference and a bidirectional reference. A first similarity threshold determined when the reference relationship is the unidirectional reference is smaller than a first similarity threshold determined when the reference relationship is the bidirectional reference. A unidirectional reference indicates that only a forward reference picture or a backward reference picture can be used for the current picture, and the bidirectional reference indicates that both the forward reference picture and the backward reference picture can be used for the current picture.

In other words, the first similarity threshold may be related to a reference relationship between pictures. As mentioned above, it is more difficult to obtain motion information from right to left or from bottom to top under the low delay configuration than under the random access configuration. A current picture under the low delay configuration can refer to only a reference picture before the current picture in POC or a reference picture before the current picture in time, while a picture under the random access configuration can refer to both the reference picture before the current picture in POC and a reference picture after the current picture in POC. Therefore, the setting of the first similarity threshold may be related to the reference relationship of the current picture. One possible method is as follows. If the current picture can refer to only the reference picture before the current picture in POC, a threshold of the picture may be multiplied by a smaller coefficient. If the current picture can refer to reference pictures before and after the current picture in POC, a threshold of the picture may be multiplied by a larger coefficient. An example is that the smaller coefficient is 1 and the larger coefficient is 4. For example, the threshold is denoted as diffThT, and a basic threshold is denoted as diffThBase which may be obtained in the other methods mentioned above. If the current picture can refer to only the reference picture before the current picture in POC, diffThT=diffThBase*1. If the current picture can refer to reference pictures before and after the current picture in POC, diffThT-diffThBase*4.

In an exemplary embodiment of the present disclosure, the first similarity threshold is determined according to whether template matching is used in a current prediction mode, and a first similarity threshold determined when the template matching is used is larger than a first similarity threshold determined when the template matching is not used. With the template matching, a search in a certain range can be implemented, thereby optimizing motion information. The search range can be expanded by using the template, so that the candidate motion information list does not need too similar candidate motion information, and two motion information may be more effective when being more different. Therefore, a threshold used for determining similarity when the template matching is used for the current block may be set larger than that when the template matching is not used.

In an exemplary embodiment of the present disclosure, the first similarity threshold is determined according to any one or more of the following parameters: a preset value, a parameter of a current picture sequence, a parameter of a current picture, a size of the current block, a sequence-level flag of the current picture sequence, a slice-level flag of the current picture, a picture-level flag of the current picture, a flag indicating whether template matching is used in a current prediction mode, or a reference relationship of the current picture. In an example, a similarity threshold of temporal motion information derived from a non-adjacent position may be a fixed value, such as 16, 32, 64, 128, etc. Since the motion information can support a precision of fractional pixel, the threshold may indicate 1 pixel unit, 2 pixel units, 4 pixel units, 8 pixel units, etc. For example, the pixel unit may be $\frac{1}{16}$ pixel. In another example, the first similarity threshold may also be related to the size of the current block, for example, the threshold may be determined according to the width and/or height or the number of samples of the current block. For example, if the number of samples of the current block is larger than 64, the threshold is set to 32, otherwise the threshold is set to 16. In yet another example, the first similarity threshold may be determined according to a flag, such as a sequence-level flag, a picture-level flag, or a slice-level flag. For example, the flag being 0 indicates that the threshold is 16, and the flag being 1 indicates that the threshold is 32.

In an example of the present embodiment, the first similarity threshold is determined according to more of the following parameters as follows. The first similarity threshold is set to a maximum of first similarity thresholds determined according to multiple parameters. The temporal motion information derived from the non-adjacent position may be determined as a maximum of similarity thresholds determined according to multiple factors. If a threshold for determining similarity preset for the temporal motion information derived from the non-adjacent position is 16 and a threshold determined according to other parameters is 1, the similarity threshold of the temporal motion information derived from the non-adjacent position is set to 16. If the similarity threshold set for the temporal motion information derived from the non-adjacent position is 16 and the threshold determined according to other parameters is 32, the similarity threshold of the temporal motion information derived from the non-adjacent position is set to 32. However, in another example, different first similarity thresholds may be determined according to different combinations of parameters.

The number of temporal motion information candidates to be added may be limited. For example, if the maximum number of temporal motion information candidates to be added is set to 2, the temporal motion information prediction performed based on subsequent positions can be exited upon determination of two temporal motion information to be added to mergeCandList.

Based on all the above methods, after the motion information to be added to mergeCandList is determined, the motion information may be sorted according to certain rules, to determine mergeCandList.

In an exemplary embodiment of the present disclosure, the method for temporal motion information prediction further includes the following. Whether non-adjacent position-based temporal motion information prediction is allowed to be used for the current block is determined according to a first flag. Based on a determination that the non-adjacent position-based temporal motion information prediction is allowed to be used, the method for temporal motion information prediction is to be performed. The first flag includes any one or more of: a first sequence-level flag indicating whether the non-adjacent position-based temporal motion information prediction is allowed to be used for a current picture sequence; a first picture-level flag indicating whether the non-adjacent position-based temporal motion information prediction is allowed to be used for a current picture; or a first slice-level flag indicating whether the non-adjacent position-based temporal motion information prediction is allowed to be used for a current slice.

In this embodiment, the first flag includes at least two of the first sequence-level flag, the first picture-level flag, or the first slice-level flag, where the first sequence-level flag has a higher level than the first picture-level flag, and the first picture-level flag has a higher level than the first slice-level flag. Whether the non-adjacent position-based temporal motion information prediction is allowed to be used for the current block is determined according to the first flag as follows. The first flag is to be parsed in a descending order of level. When a flag of a higher level indicates that the non-adjacent position-based temporal motion information prediction is allowed to be used, a flag of a lower level is to be parsed. When flags of all levels indicate that the non-adjacent position-based temporal motion information prediction is allowed to be used, that the non-adjacent position-based temporal motion information prediction is allowed to be used is determined.

In an exemplary embodiment of the present disclosure, the method for temporal motion information prediction further includes the following. Whether the first flag is to be parsed is determined according to a second flag. Based on a determination that the first flag is to be parsed, the first flag is to be parsed. Whether the non-adjacent position-based temporal motion information prediction is allowed to be used for the current block is determined according to the first flag. The second flag includes any one or more of: a flag indicating whether temporal motion information is allowed to be used for a current picture sequence, where the first flag is determined not to be parsed if the flag indicates that the temporal motion information is not allowed to be used for the current picture sequence; a flag indicating whether the temporal motion information is allowed to be used for the current picture, where the first flag is determined not to be parsed if the flag indicates that the temporal motion information is not allowed to be used for the current picture; or a flag indicating whether a non-adjacent position is allowed to be used for motion information deriving, where the first flag is determined not to be parsed if the flag indicates that the non-adjacent position is not allowed to be used for motion information deriving. Based on a determination, according to the second flag, that the first flag is to be parsed, the first flag is to be parsed.

In this embodiment, the flag is used for controlling the enablement and disablement of the non-adjacent position-based temporal motion information prediction.

The enablement and disablement of the non-adjacent position-based temporal motion information prediction may be controlled via a flag. The flag may be a sequence-level (sequence parameter set) flag, a picture-level (picture header or picture parameter set) flag, a slice-level (slice header) flag, or a block-level flag. The flag may control whether the non-adjacent position-based temporal motion information prediction in the present disclosure is used (or is allowed to be used) for a corresponding sequence, picture, slice, or block. In an example, if a value of the flag is 1, the non-adjacent position-based temporal motion information prediction in the present disclosure is used (or is allowed to be used) for the current sequence, picture, slice, or block. If the value of the flag is 0, the non-adjacent position-based temporal motion information prediction in the present disclosure is not used (or is not allowed to be used) for the current sequence, picture, slice, or block. The flag may depend on other flags, such as sps_temporal_mvp_enabled_flag or ph_temporal_mvp_enabled_flag. The flag, sps_temporal_mvp_enabled_flag, may control whether the temporal motion information is allowed to be used for the current sequence. The flag, ph_temporal_mvp_enabled_flag, may control whether the temporal motion information is allowed to be used for the current picture. It may be understood that if the temporal motion information is allowed to be used for the current sequence or the current picture, a decoder is to parse the flag for controlling whether the non-adjacent position-based temporal motion information prediction is allowed to be used. Otherwise, the decoder is not to parse the flag for controlling whether the non-adjacent position-based temporal motion information prediction is allowed to be used. The flag may also depend on other flags, such as a flag indicating whether motion information derived from the non-adjacent position is allowed to be used.

The flag for controlling the non-adjacent position-based temporal motion information prediction may be set in a hierarchical manner, where a flag of a lower level depends on a flag of a higher level. For example, a sequence-level flag, sps_natmvp_enabled_flag, may control whether the non-adjacent position-based temporal motion information prediction is allowed to be used for the current sequence, and a picture-level flag, ph_natmvp_enabled_flag, may control whether the non-adjacent position-based temporal motion information prediction is allowed to be used for the current picture. If a value of sps_natmvp_enabled_flag is 1, the decoder is to parse ph_natmvp_enabled_flag. If the value of sps_natmvp_enabled_flag is 0, the decoder is not to parse ph_natmvp_enabled_flag.

In the method for candidate motion information list constructing in the above embodiments of the present disclosure, the temporal motion information derived from the non-adjacent position can be added to the candidate motion information list, and the correlation order between the temporal motion information derived from the non-adjacent position and other motion information is considered, which can effectively supplement the motion information of some scenarios that cannot be covered by the spatial motion information, thereby improving the compression efficiency.

A method for video encoding is further provided in an embodiment of the present disclosure. As illustrated in FIG. 14, the method includes the following.

At S310, a candidate motion information list of a current block is constructed according to the method for candidate motion information list constructing in any embodiment of the present disclosure.

At S320, one or more candidate motion information is selected from the candidate motion information list, and an index of the selected candidate motion information is recorded.

At S330, a prediction block for the current block is determined according to the selected candidate motion information, the current block is encoded based on the prediction block, and the index of the candidate motion information is encoded.

A position of a reference block for the current block in a reference picture can be determined according to the selected candidate motion information. In this case, the reference block can be obtained by adding an MVD to the selected candidate motion information, and the prediction block can be obtained based on the reference block (such as one or two). Subsequently, a residual between the prediction block and the current block can be calculated and encoded.

A method for video decoding is further provided in an embodiment of the present disclosure. As illustrated in FIG. 15, the method includes the following.

At S410, a candidate motion information list of a current block is constructed according to the method for candidate motion information list constructing in any embodiment of the present disclosure.

At S420, one or more candidate motion information is selected from the candidate motion information list according to an index of candidate motion information of the current block obtained by decoding.

At S430, a prediction block for the current block is determined according to the selected candidate motion information, and the current block is reconstructed according to the prediction block.

Figure 16:
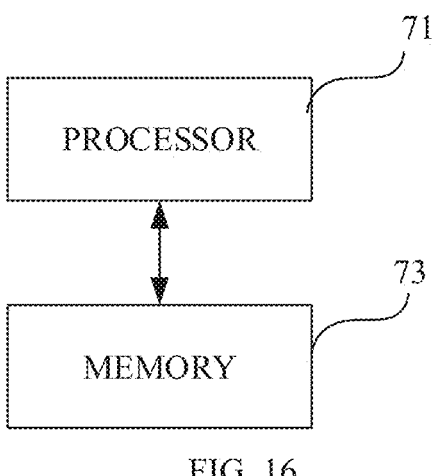
FIG. 16 is a schematic diagram of an apparatus for temporal motion information prediction according to an embodiment of the present disclosure.

An apparatus for temporal motion information prediction is further provided in an embodiment of the present disclosure. As illustrated in FIG. 16, the apparatus for temporal motion information prediction includes a memory 73 configured to store a computer program and a processor 71 configured to execute the computer program to perform the method for temporal motion information prediction in any embodiment of the present disclosure.

An apparatus for candidate motion information list constructing is further provided in an embodiment of the present disclosure. As illustrated in FIG. 16, the apparatus for candidate motion information list constructing includes a memory configured to store a computer program and a processor configured to execute the computer program to perform the method for candidate motion information list constructing in any embodiment of the present disclosure.

An apparatus for video encoding is further provided in an embodiment of the present disclosure. As illustrated in FIG. 16, the apparatus for video encoding includes a memory configured to store a computer program and a processor configured to execute the computer program to perform the method for video encoding in any embodiment of the present disclosure.

An apparatus for video decoding is further provided in an embodiment of the present disclosure. As illustrated in FIG. 16, the apparatus for video decoding includes a memory configured to store a computer program and a processor configured to execute the computer program to perform the method for video decoding in any embodiment of the present disclosure.

A system for video coding is further provided in an embodiment of the present disclosure. The system for video coding includes the apparatus for video encoding in any embodiment of the present disclosure and the apparatus for video decoding in any embodiment of the present disclosure.

A non-transitory computer-readable storage medium is further provided in an embodiment of the present disclosure. The non-transitory computer-readable storage medium is configured to store a computer program which, when executed by a processor, causes the processor to perform the method in any embodiment of the present disclosure.

A bitstream is further provided in an embodiment of the present disclosure. The bitstream is generated according to the method for video encoding in any embodiment of the present disclosure.

The apparatus for video encoding and/or the apparatus for video decoding in the foregoing embodiments of the disclosure may be implemented by any one of the following circuits or any combination of the following circuits: one or more microprocessors, digital signal processors (DSPs), application specific integrated circuits (ASICs), field programmable gate arrays (FPGAs), discrete logic, and hardware. If the disclosure is implemented partially by software, instructions for the software may be stored in a suitable non-transitory computer-readable storage medium, and may be executed by hardware of one or more processors to implement the methods of embodiments of the disclosure.

In one or more exemplary embodiments, the functions described may be implemented by hardware, software, firmware, or any combination thereof. If implemented by software, the functions may be stored in or transmitted over a computer-readable medium as one or more instructions or codes and executed by a hardware-based processing unit. The computer-readable medium may include a computer-readable storage medium corresponding to a tangible medium such as a data storage medium, or a communication medium including any medium for transmitting computer programs from one place to another, for example, based on a communication protocol. In this manner, the computer-readable medium may usually correspond to a non-transitory tangible computer-readable storage medium or a communication medium such as a signal or a carrier. The data storage medium may be any available medium that can be accessed by one or more computers or one or more processors to retrieve instructions, codes, and/or data structures for implementation of the technology described in the disclosure. A computer program product may include a computer-readable medium.

By way of example rather than limitation, such computer-readable storage medium may include a random access memory (RAM), a read-only memory (ROM), an electrically erasable programmable ROM (EEPROM), a compact disc ROM (CD-ROM) or other optical disc storage devices, magnetic disc storage devices or other magnetic storage devices, flash memory, or any other medium that can be used to store desired program codes in the form of instructions or data structures and can be accessed by a computer. In addition, any connection may be termed a computer-readable medium. For example, if instructions are transmitted from a website, server, or other remote sources by using a coaxial cable, an optical fiber cable, a twisted pair, a digital subscriber line (DSL), or a wireless technology such as infrared, radio, and microwave, the coaxial cable, the optical fiber cable, the twisted pair, the DSL, or the wireless technology such as infrared, radio, and microwave are included in the definition of a medium. However, it may be appreciated, that the computer-readable storage medium and the data storage medium do not include a connection, a carrier, a signal, or other transitory media, but are intended for a non-transitory tangible storage medium. The magnetic disc and the optical disc used herein include a CD, a laser disc, an optical disc, a digital versatile disc (DVD), a floppy disc or a Blu-Ray disc, etc. where the magnetic disc usually reproduces data magnetically, while the optical disc reproduces data optically with lasers. Combinations of the above shall also be included within the scope of the computer-readable medium.

Instructions may be executed by one or more processors, such as one or more DSPs, general-purpose microprocessors, ASICs, FPGAs, or other equivalent integrated or discrete logic circuits. Thus, the term "processor" used herein may refer to any of the foregoing structure or any other structure suitable for implementation of the technology described herein. In addition, in some aspects, the functionality described herein may be provided within dedicated hardware and/or software modules configured for coding, or incorporated in an integrated encoder-decoder. In addition, the technology may be embodied completely in one or more circuits or logic elements.

The technical solutions of embodiments of the disclosure can be implemented in a wide variety of apparatuses or devices, including a wireless mobile phone, an integrated circuit (IC), or a group of ICs (e. g., a chipset). Various components, modules, or units described in embodiments of the disclosure are configured to implement functions of devices based on the described technology, but do not necessarily mean that these functions shall be implemented by different hardware units respectively. Instead, as described above, various units may be combined in a hardware unit of an encoder-decoder or implemented by a collection of interoperative hardware units (including one or more processors described above) in conjunction with suitable software and/or firmware.

What is claimed is:

1. A method for temporal motion information prediction, comprising:

determining, according to a first flag, whether non-adjacent position-based temporal motion information prediction is allowed to be used for the current block; and based on a determination that the non-adjacent position-based temporal motion information prediction is allowed to be used, determining at least one non-adjacent position of a current block; and determining first temporal motion information of the current block according to motion information of the at least one non-adjacent position in a coded picture, wherein the coded picture is a reference picture of the current block; and determining the first temporal motion information of the current block according to the motion information of the at least one non-adjacent position in the coded picture comprises:

determining a collocated block corresponding to the non-adjacent position in the reference picture;

obtaining motion information of the collocated block; and obtaining the first temporal motion information of the current block by scaling a motion vector in the obtained motion information;

wherein the first flag comprises any one or more of:

a first sequence-level flag indicating whether the non-adjacent position-based temporal motion information prediction is allowed to be used for a current picture sequence;

a first picture-level flag indicating whether the non-adjacent position-based temporal motion information prediction is allowed to be used for a current picture; or a first slice-level flag indicating whether the non-adjacent position-based temporal motion information prediction is allowed to be used for a current slice.

2. The method of claim 1, wherein the non-adjacent position comprises any one or more of non-adjacent positions in the following directions:

a non-adjacent position on a right of the current block;

a non-adjacent position on a bottom of the current block; or a non-adjacent position on a bottom right of the current block;

wherein when there are at least three positions in a same direction for deriving the first temporal motion information, distances between adjacent positions among the at least three positions are the same, or the distances between the adjacent positions among the at least three positions are variable and a distance between two adjacent positions farther from the current block is larger.

3. The method of claim 1, wherein:

a horizontal distance and/or a vertical distance between the non-adjacent position and a set sample in the current block are preset fixed values; or the horizontal distance and/or the vertical distance between the non-adjacent position and the set sample in the current block are variable and are determined according to the following parameters or any combination of the following parameters:

a size of the current block;

a parameter of a current picture sequence;

a sequence-level flag of the current picture sequence;

a picture-level flag of a current picture; or a slice-level flag of the current picture.

4. The method of claim 1, wherein the non-adjacent position is within a range of a largest coding unit (LCU) or a coding tree unit (CTU) where the current block is located, or the non-adjacent position is within a range of an LCU row or a CTU row where the current block is located.

5. The method of claim 1, further comprising adjacent position-based temporal motion information prediction;

wherein an adjacent position comprises an adjacent position of a bottom-right corner of the current block, the non-adjacent position of the current block and the adjacent position of the bottom-right corner of the current block are distributed in an array, a top-left corner of the array is the adjacent position of the bottom-right corner of the current block, and different positions in the array are distributed on different minimum storage units in the coded picture.

6. The method of claim 1, wherein:

the first flag comprises at least two of the first sequence-level flag, the first picture-level flag, or the first slice-level flag, the first sequence-level flag has a higher level than the first picture-level flag, and the first picture-level flag has a higher level than the first slice-level flag; and determining, according to the first flag, whether the non-adjacent position-based temporal motion information prediction is allowed to be used for the current block comprises:

parsing the first flag in a descending order of level;

parsing a flag of a lower level when a flag of a higher level indicates that the non-adjacent position-based temporal motion information prediction is allowed to be used; and determining that the non-adjacent position-based temporal motion information prediction is allowed to be used when flags of all levels indicate that the non-adjacent position-based temporal motion information prediction is allowed to be used.

7. The method of claim 1, further comprising:

determining, according to a second flag, whether the first flag is to be parsed;

parsing the first flag based on a determination that the first flag is to be parsed; and determining, according to the first flag, whether the non-adjacent position-based temporal motion information prediction is allowed to be used for the current block;

wherein the second flag comprises any one or more of:

a flag indicating whether temporal motion information is allowed to be used for a current picture sequence, wherein the first flag is determined not to be parsed if the flag indicates that the temporal motion information is not allowed to be used for the current picture sequence;

a flag indicating whether the temporal motion information is allowed to be used for the current picture, wherein the first flag is determined not to be parsed if the flag indicates that the temporal motion information is not allowed to be used for the current picture; or a flag indicating whether a non-adjacent position is allowed to be used for motion information deriving, wherein the first flag is determined not to be parsed if the flag indicates that the non-adjacent position is not allowed to be used for motion information deriving;

wherein the first flag is to be parsed based on a determination, according to the second flag, that the first flag is to be parsed.

8. The method of claim 1, wherein the at least one non-adjacent position comprises any one or more of:

a first position with coordinates (xCb+2*k_cbWidth−1, yCb+2*k_cbHeight−1), (xCb+2*k_cbWidth, yCb+2*k_cbHeight−1), (xCb+2*k_cbWidth−1, yCb+2*k_cbHeight), or (xCb+2*k_cbWidth, yCb+2*k_cbHeight);

a second position with coordinates (xCb+3*k_cbWidth−1, yCb+3*k_cbHeight−1), (xCb+3*k_cbWidth, yCb+3*k_cbHeight−1), (xCb+3*k_cbWidth−1, yCb+3*k_cbHeight), or (xCb+3*k_cbWidth, yCb+3*k_cbHeight);

a third position with coordinates (xCb+3*k_cbWidth−1, yCb+k_cbHeight/2−1), (xCb+3*k_cbWidth, yCb+k_cbHeight/2−1), (xCb+3*k_cbWidth−1, yCb+k_cbHeight/2), or (xCb+3*k_cbWidth, yCb+k_cbHeight/2);

a fourth position with coordinates (xCb+k_cbWidth/2, yCb+3*k_cbHeight−1), (xCb+k_cbWidth/2, yCb+

3*k_cbHeight), (xCb+k_cbWidth/2−1, yCb+ 3*k_cbHeight−1), or (xCb+k_cbWidth/2−1, yCb+ 3*k_cbHeight);

a fifth position with coordinates (xCb+2*k_cbWidth−1, yCb+k_cbHeight/2−1), (xCb+2*k_cbWidth, yCb+ k_cbHeight/2−1), (xCb+2*k_cbWidth−1, yCb+ k_cbHeight/2), or (xCb+2*k_cbWidth, yCb+ k_cbHeight/2);

a sixth position with coordinates (xCb+k_cbWidth/2, yCb+2*k_cbHeight−1), (xCb+k_cbWidth/2, yCb+ 2*k_cbHeight), (xCb+k_cbWidth/2−1, yCb+ 2*k_cbHeight−1), or (xCb+k_cbWidth/2−1, yCb+ 2*k_cbHeight);

a seventh position with coordinates (xCb+k_cbWidth, yCb+2*k_cbHeight), (xCb+k_cbWidth, yCb+ 2*k_cbHeight−1), (xCb+k_cbWidth−1, yCb+ 2*k_cbHeight), or (xCb+k_cbWidth−1, yCb+ 2*k_cbHeight−1); or an eighth position with coordinates (xCb+2*k_cbWidth, yCb+k_cbHeight), (xCb+2*k_cbWidth−1, yCb+ k_cbHeight), (xCb+2*k_cbWidth, yCb+k_cbHeight− 1), or (xCb+2*k_cbWidth−1, yCb+k_cbHeight−1);

wherein xCb is a horizontal coordinate of a top-left corner of the current block, yCb is a vertical coordinate of the top-left corner of the current block, k cbWidth is a width, ½ width, ¼ width, or double width of the current block, k_cbHeight is a height, ½ height, ¼ height, or double height of the current block, and "*" indicates multiplication operation.

9. A method for candidate motion information list constructing, comprising:

determining spatial motion information and temporal motion information of a current block by performing spatial motion information prediction and temporal motion information prediction on the current block; and adding the spatial motion information and the temporal motion information to a candidate motion information list of the current block in a set order;

wherein the temporal motion information prediction adopts:

determining, according to a first flag, whether non-adjacent position-based temporal motion information prediction is allowed to be used for the current block; and based on a determination that the non-adjacent position-based temporal motion information prediction is allowed to be used, determining at least one non-adjacent position of the current block; and determining first temporal motion information of the current block according to motion information of the at least one non-adjacent position in a coded picture, wherein the coded picture is a reference picture of the current block; and determining the first temporal motion information of the current block according to the motion information of the at least one non-adjacent position in the coded picture comprises:

determining a collocated block corresponding to the non-adjacent position in the reference picture;

obtaining motion information of the collocated block; and obtaining the first temporal motion information of the current block by scaling a motion vector in the obtained motion information;

wherein the first flag comprises any one or more of:

a first sequence-level flag indicating whether the non-adjacent position-based temporal motion information prediction is allowed to be used for a current picture sequence;

a first picture-level flag indicating whether the non-adjacent position-based temporal motion information prediction is allowed to be used for a current picture; or a first slice-level flag indicating whether the non-adjacent position-based temporal motion information prediction is allowed to be used for a current slice, and the temporal motion information comprises the first temporal motion information.

10. The method of claim 9, wherein the set order is determined according to one or more of the following rules:

when a distance of the spatial motion information is less than or equal to a distance of the temporal motion information, the spatial motion information is to be preferentially added to the candidate motion information list;

when the distance of the spatial motion information is larger than the distance of the temporal motion information, the temporal motion information is to be preferentially added to the candidate motion information list;

when distances of a plurality of temporal motion information are different, temporal motion information with a smaller distance is to be preferentially added to the candidate motion information list; or when the distances of the plurality of temporal motion information are the same, an order in which the plurality of temporal motion information are added to the candidate motion information list is determined according to a statistical law of the temporal motion information;

wherein the distance of the spatial motion information refers to a distance from a position where the spatial motion information is derived to the current block, and the distance of the temporal motion information refers to a distance from a position where the temporal motion information is derived to the current block, a distance from a position to the current block is determined according to a rectangular box which the position is located in or adjacent to, the current block is surrounded by the rectangular box and is at a center of the rectangular box, a width of the rectangular box is integer multiples of a width of the current block, a height of the rectangular box is integer multiples of a height of the current block, and a larger area of the rectangular box leads to a larger distance from the position to the current block.

11. The method of claim 10, wherein:

the first temporal motion information comprises at least two of:

first temporal motion information derived from a non-adjacent position of the bottom right of the current block;

first temporal motion information derived from a non-adjacent position of the right of the current block; or first temporal motion information derived from a non-adjacent position of the bottom of the current block; and when the distances of the plurality of first temporal motion information are the same, the order in which the plurality of first temporal motion information are added to the candidate motion information list being determined according to the statistical law of the temporal motion information comprises:

the first temporal motion information derived from the non-adjacent position of the bottom right of the current block is to be preferentially added to the candidate motion information list over the first temporal motion information derived from the non-adjacent position of the right of the current block; and the first temporal motion information derived from the non-adjacent position of the right of the current block is to be preferentially added to the candidate motion information list over the first temporal motion information derived from the non-adjacent position of the bottom of the current block.

12. The method of claim 9, wherein an order of most preceding first temporal motion information among the first temporal motion information is determined according to at least one of the following manners:

in a geometric partitioning mode (GPM), a serial number set for the most preceding first temporal motion information is less than or equal to a maximum number of candidate motion information allowed to be added to the candidate motion information list; or in a set high-speed motion scenario, the serial number set for the most preceding first temporal motion information is less than or equal to the maximum number of the candidate motion information allowed to be added to the candidate motion information list.

13. The method of claim 9, wherein adding the spatial motion information and the temporal motion information to the candidate motion information list of the current block in the set order comprises:

performing similarity check before adding the spatial motion information or the temporal motion information to the candidate motion information list; and based on a determination through the similarity check that the spatial motion information or the temporal motion information is not similar to any one of candidate motion information that has been added or determined to be added to the candidate motion information list, adding the spatial motion information or the temporal motion information to the candidate motion information list;

wherein a first similarity threshold 01 is used when the similarity check is performed on the first temporal motion information, a second similarity threshold θ2 is used when the similarity check is performed on the spatial motion information, and θ1>θ2 or θ1=θ2.

14. The method of claim 13, wherein the temporal motion information comprises temporal motion information determined through adjacent position-based temporal motion information prediction, a third similarity threshold 03 is used when the similarity check is performed on the temporal motion information determined through the adjacent position-based temporal motion information prediction, and θ1>θ3 or θ1=θ3.

15. The method of claim 13, wherein:

the first similarity threshold is determined according to one of the following parameters: a parameter of a current picture sequence, or a parameter of a current picture;

the parameter of the current picture sequence comprises sequence resolution;

the parameter of the current picture comprises any one or more of the following parameters: a picture width, a picture height, or the number of samples of the picture;

the first similarity threshold comprises a plurality of first similarity thresholds, and a larger first similarity threshold corresponds to a larger parameter value.

16. The method of claim 13, wherein:

the first similarity threshold is determined according to a reference relationship of a current picture, wherein the reference relationship comprises a unidirectional reference and a bidirectional reference;

a first similarity threshold determined when the reference relationship is the unidirectional reference is smaller than a first similarity threshold determined when the reference relationship is the bidirectional reference;

the unidirectional reference indicates that only a forward reference picture or a backward reference picture can be used for the current picture, and the bidirectional reference indicates that both the forward reference picture and the backward reference picture can be used for the current picture.

17. The method of claim 13, wherein the first similarity threshold is determined according to whether template matching is used in a current prediction mode, and a first similarity threshold determined when the template matching is used is larger than a first similarity threshold determined when the template matching is not used.

18. The method of claim 13, wherein the first similarity threshold is determined according to any one or more of the following parameters: a preset value, a parameter of a current picture sequence, a parameter of a current picture, a size of the current block, a sequence-level flag of the current picture sequence, a slice-level flag of the current picture, a picture-level flag of the current picture, a flag indicating whether template matching is used in a current prediction mode, or a reference relationship of the current picture.

19. A method for video decoding, comprising:

constructing a candidate motion information list of a current block by:

determining spatial motion information and temporal motion information of a current block by performing spatial motion information prediction and temporal motion information prediction on the current block; and adding the spatial motion information and the temporal motion information to a candidate motion information list of the current block in a set order;

wherein the temporal motion information prediction adopts:

determining, according to a first flag, whether non-adjacent position-based temporal motion information prediction is allowed to be used for the current block; and based on a determination that the non-adjacent position-based temporal motion information prediction is allowed to be used, determining at least one non-adjacent position of the current block; and determining first temporal motion information of the current block according to motion information of the at least one non-adjacent position in a coded picture, wherein the coded picture is a reference picture of the current block; and determining the first temporal motion information of the current block according to the motion information of the at least one non-adjacent position in the coded picture comprises:

determining a collocated block corresponding to the non-adjacent position in the reference picture;

obtaining motion information of the collocated block; and obtaining the first temporal motion information of the current block by scaling a motion vector in the obtained motion information;

wherein the first flag comprises any one or more of:

a first sequence-level flag indicating whether the non-adjacent position-based temporal motion information prediction is allowed to be used for a current picture sequence;

a first picture-level flag indicating whether the non-adjacent position-based temporal motion information prediction is allowed to be used for a current picture; or a first slice-level flag indicating whether the non-adjacent position-based temporal motion information prediction is allowed to be used for a current slice, and the temporal motion information comprises the first temporal motion information;

selecting one or more candidate motion information from the candidate motion information list according to an index of candidate motion information of the current block obtained by decoding; and determining a prediction block for the current block according to the selected candidate motion information, and reconstructing the current block according to the prediction block.

\* \* \* \* \*